United States Patent
Kikuchi

(10) Patent No.: US 9,730,180 B2
(45) Date of Patent: Aug. 8, 2017

(54) COMMUNICATION CONTROL DEVICE AND METHOD

(71) Applicant: FUJITSU LIMITED, Kawasaki-shi, Kanagawa (JP)

(72) Inventor: Shunsuke Kikuchi, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/730,598

(22) Filed: Jun. 4, 2015

(65) Prior Publication Data
US 2016/0013856 A1  Jan. 14, 2016

(30) Foreign Application Priority Data
Jul. 9, 2014  (JP) ................................. 2014-141404

(51) Int. Cl.
| | |
|---|---|
| *H04W 64/00* | (2009.01) |
| *H04W 4/02* | (2009.01) |
| H04W 88/04 | (2009.01) |
| H04W 88/08 | (2009.01) |
| H04B 7/155 | (2006.01) |
| H04W 84/12 | (2009.01) |

(52) U.S. Cl.
CPC .......... *H04W 64/003* (2013.01); *H04W 4/02* (2013.01); *H04B 7/15507* (2013.01); *H04W 84/12* (2013.01); *H04W 88/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2004/0260805 A1* | 12/2004 | Aoyama | H04W 36/0066 709/224 |
| 2006/0159047 A1* | 7/2006 | Olvera-Hernandez | H04W 36/005 370/331 |
| 2011/0305294 A1 | 12/2011 | Moriya et al. | |
| 2012/0014316 A1* | 1/2012 | Rahman | H04W 40/36 370/328 |

FOREIGN PATENT DOCUMENTS

| | | |
|---|---|---|
| JP | 2010-171592 | 8/2010 |
| JP | 2013-219740 | 10/2013 |

* cited by examiner

*Primary Examiner* — Christine Duong
(74) *Attorney, Agent, or Firm* — Staas & Halsey LLP

(57) ABSTRACT

A communication control device that controls a communication device configured to be coupled to a network using a first communication, and to be coupled to an information processing device using a second wireless communication, the communication control device includes a processor configured to store identification information of the communication device and connection information used for setting the second wireless communication, control the communication device to stop the second wireless communication when it is detected that the communication device exists within a wireless communication area of a wireless communication device coupled to the network, transmit, to the wireless communication device, the connection information associated with the identification information of the communication device, and control the wireless communication device to establish a new wireless connection with the information processing device using the connection information.

20 Claims, 26 Drawing Sheets

FIG. 10

| COMMUNICATION TERMINAL IDENTIFIER | REGISTRATION DESTINATION AP | TETHERING AP INFORMATION | CURRENT LOCATION | PREVIOUS LOCATION |
|---|---|---|---|---|
| 090-xxxx-yyyy | AP1 | SSID1,PSWD1, WPA2,... | LATITUDE (Y11°Y21', Y31"), LONGITUDE (X11°X21',X32"), ALTITUDE 1m | LATITUDE (Y12°Y22', Y32"), LONGITUDE (X12°X22',X32"), ALTITUDE 1m |
| 080-zzzz-aaaa | UNREGISTERED | SSID2,PSWD2, WPA2,... | LATITUDE (Y13°Y23', Y33"), LONGITUDE (X13°X23',X32"), ALTITUDE 1m | LATITUDE (Y14°Y24', Y34"), LONGITUDE (X14°X24',X34"), ALTITUDE 1m |
| ... | ... | ... | ... | ... |

| COMMUNICATION TERMINAL IDENTIFIER | TETHERING AP INFORMATION |
|---|---|
| 090-xxxx-yyyy | SSID1,PSWD1,WPA2,... |
| ... | ... |

| COMMUNICATION TERMINAL IDENTIFIER | REGISTRATION DESTINATION AP | TETHERING AP INFORMATION | CURRENT LOCATION | PREVIOUS LOCATION | RADIO WAVE INTENSITY |
|---|---|---|---|---|---|
| 090-xxxx-yyyy | AP1 | SSID1,PSWD1, WPA2,... | LATITUDE (Y11°Y21', Y31"), LONGITUDE (X11°X21',X32"), ALTITUDE 1m | LATITUDE (Y12°Y22', Y32"), LONGITUDE (X12°X22',X32"), ALTITUDE 1m | 10 (mW) |
| 080-zzzz-aaaa | UNREGISTERED | SSID2,PSWD2, WPA2,... | LATITUDE (Y13°Y23', Y33"), LONGITUDE (X13°X23',X32"), ALTITUDE 1m | LATITUDE (Y14°Y24', Y34"), LONGITUDE (X14°X24',X34"), ALTITUDE 1m | 5 (mW) |
| ... | ... | ... | ... | ... | ... |

COMMUNICATION CONTROL DEVICE AND METHOD

CROSS-REFERENCE TO RELATED APPLICATION

This application is based upon and claims the benefit of priority of the prior Japanese Patent Application No. 2014-141404, filed on Jul. 9, 2014, the entire contents of which are incorporated herein by reference.

FIELD

The embodiments discussed herein are related to a technology for controlling communication.

BACKGROUND

As communication terminals have advanced functions, communication terminals each having two or more wireless communication functions are proposed.

A first wireless communication function included in such a communication terminal is a function to be wirelessly coupled to a base station and perform wireless communication using a wireless communication method such as, for example, Long Term Evolution (LTE) or Third Generation (3G). Note that the base station is coupled to a large-scale network.

Furthermore, a second wireless communication function included in such a communication terminal is a wireless communication function such as, for example, wireless local area network (LAN) communication. Such a communication terminal is coupled to another terminal using the second wireless communication function.

In addition, such a communication terminal has a so-called tethering function to relay communication between the other terminal connected using the second wireless communication function and the base station connected using the first wireless communication function. Using the communication based on the tethering (hereinafter, arbitrarily expressed as tethering communication), the other terminal communicates with the large-scale network through the communication terminal and the base station.

These technologies of the related art are disclosed in, for example, Japanese Laid-open Patent Publication No. 2013-219740 and Japanese Laid-open Patent Publication No. 2010-171592.

SUMMARY

According to an aspect of the invention, a communication control device that controls a communication device configured to be coupled to a network using a first communication, to be coupled to an information processing device using a second wireless communication, and to relay communication between the information processing device and the network using the first communication and the second wireless communication, the communication control device includes: a memory; and a processor coupled to the memory and configured to: store, into the memory, identification information of the communication device associated with connection information used for setting the second wireless communication between the communication device and the information processing device, control the communication device to stop the second wireless communication between the communication device and the information processing device when it is detected that the communication device exists within a wireless communication area of a wireless communication device coupled to the network, transmit, to the wireless communication device, the connection information associated with the identification information of the communication device, and control the wireless communication device to establish a new wireless connection between the wireless communication device and the information processing device using the connection information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating a communication terminal list;

FIG. 15 is a diagram illustrating an AP information list;

FIG. 22 is a diagram illustrating a communication terminal list;

DESCRIPTION OF EMBODIMENTS

A state in which a large number of users each possess an information processing terminal (information processing device) and a communication terminal (communication device) and gather at a location (for example, an event site) is assumed. Here, the communication terminal of each of the users has a tethering function and wirelessly communicates with the information processing terminal of the same user. For example, a first user has a first communication terminal and a first information processing terminal, and the first information processing terminal is coupled to a large-scale network using the tethering function of the first communication terminal. In addition, for example, a second user has a second communication terminal and a second information processing terminal, and the second information processing terminal is coupled to the large-scale network using the tethering function of the second communication terminal.

With such an assumption, between such communication terminals, the communication areas of wireless communication based on the above-mentioned second wireless communication function (for example, a wireless LAN) overlap with each other in some cases. Then, between the communication terminals, mutual interference of radio waves due to, for example, transmission of the same channel occurs in some cases. Owing to mutual interference of radio waves, wireless communication throughput between the communication terminals and the information processing terminals is reduced.

An aspect of the present embodiment is aimed at reducing wireless communications traffic between a communication terminal and a corresponding information processing terminal.

Tethering Communication

Figure 1:
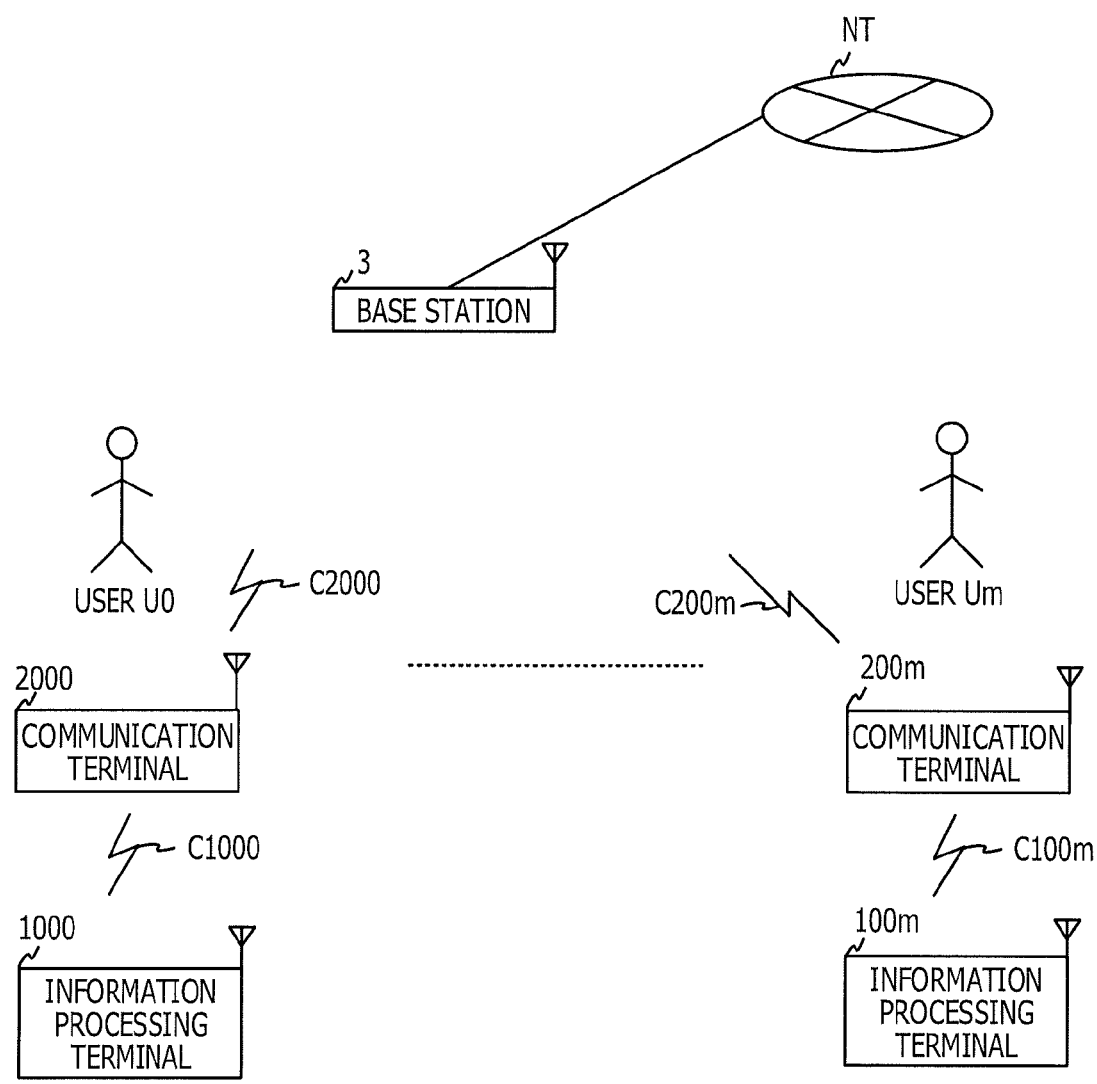
FIG. 1 is a diagram for explaining tethering communication.

FIG. 1 is a diagram for explaining tethering communication. A user Um moves around freely at various locations (for example, event sites) while possessing an information processing terminal 100m and a communication terminal 200m. Here, the lower-case "m" is an integer greater than or equal to one. Hereinafter, the same symbol is assigned to the configuration of the same function and the repeated description of this configuration will be omitted.

The information processing terminal 100m is a movable small-sized information processing terminal such as, for example, a laptop personal computer. The information processing terminal 100m performs wireless communication (see symbol C100m) with the communication terminal 200m.

The communication terminal 200m is a movable small-sized communication terminal such as, for example, a mobile phone, a smartphone, or a tablet terminal. The communication terminal 200m performs wireless communication (see symbol C100m) with the information processing terminal 100m and furthermore performs wireless communication (see symbol C200m) with a base station 3. The communication terminal 200m has a function to perform tethering communication for relaying (also called routing) communication between the information processing terminal 100m and the base station 3.

In this way, the communication terminal 200m functions as an access point (AP) used by the information processing terminal 100m to be coupled to the base station 3. Note that an access point is the generic term for a device connecting a terminal and another device to each other or for connecting the terminal and the other device to a base station or a network (for example, a wired LAN or the Internet).

The base station 3 performs wireless communication with the communication terminal 200m and performs, for example, wired communication with a large-scale network NT. The large-scale network NT is, for example, the Internet.

The wireless communication between the information processing terminal 100m and the communication terminal 200m is wireless local area network (LAN) communication to which, for example, the IEEE 802.11 standard is applied. Note that the wireless LAN to which the IEEE 802.11 standard is applied is also called Wi-Fi (registered trademark).

In the wireless communication between the base station 3 and the communication terminal 200m, a wireless communication method such as, for example, LTE or 3G is used.

The communication distance of the wireless communication between the base station 3 and the communication terminal 200m is longer than the communication distance of the wireless communication between the information processing terminal 100m and the communication terminal 200m.

Using tethering communication, the information processing terminal 100m is coupled to the large-scale network NT through the communication terminal 200m and the base station 3. By operating the information processing terminal 100m, the user Um accesses the large-scale network NT and performs searches and browsing.

Note that an information processing terminal 1000 and a communication terminal 2000 of a user U0 have the same functions as those of the information processing terminal 100m and the communication terminal 200m, respectively. For example, the communication terminal 2000 has the same tethering function as the communication terminal 200m. In addition, wireless communication is performed between the information processing terminal 1000 and the communication terminal 2000 (see symbol C1000).

Here, a state in which a large number of users each possess an information processing terminal and a communication terminal and gather at a location (for example, an event site) is assumed. Furthermore, a state in which the information processing terminal of each of the users performs communication using the tethering function of the corresponding communication terminal is assumed. In such a state, between the communication terminals whose wireless communication areas overlap with each other, mutual interference of radio waves due to, for example, transmission of the same channel occurs in some cases. In other words, too many access points exist, and between the access points, mutual interference of radio waves due to transmission of the same channel occurs in some cases.

Owing to this mutual interference of radio waves, wireless communication throughput between a communication terminal and a corresponding information processing terminal is reduced. Therefore, an embodiment for reducing wireless communications traffic between a communication terminal and a corresponding information processing terminal and achieving suppression of mutual interference of radio waves will be described later.

First Embodiment

Whole System

Figure 2:
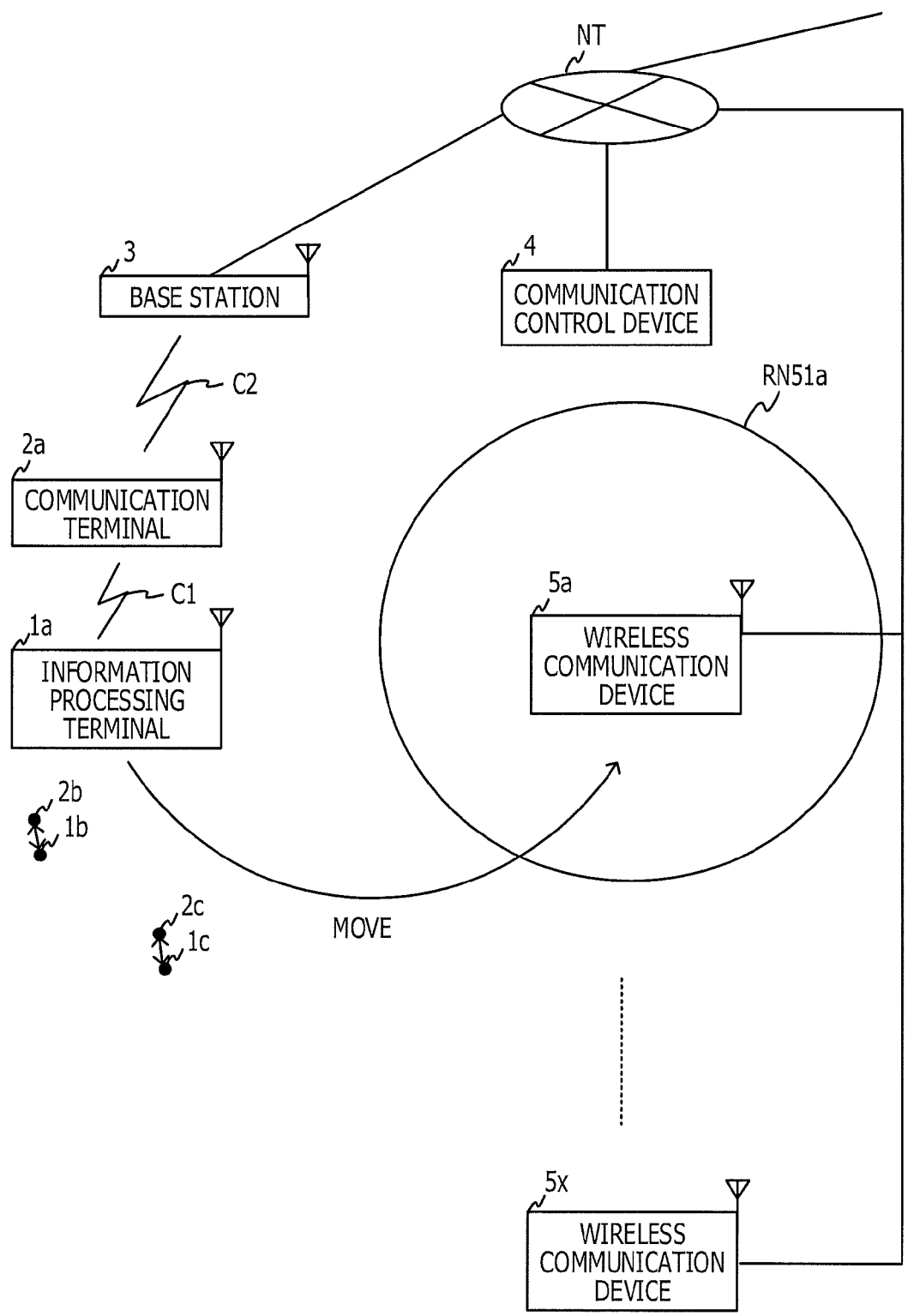
FIG. 2 is a whole system diagram for explaining the present embodiment.

FIG. 2 is a whole system diagram for explaining the present embodiment. An information processing terminal 1a is a movable small-sized information processing terminal such as, for example, a laptop personal computer. The information processing terminal 1a performs wireless communication (see symbol C1) with a communication terminal 2a.

The communication terminal 2a is a movable small-sized communication terminal such as, for example, a mobile phone, a smartphone, or a tablet terminal, and is also called a mobile device. The communication terminal 2a performs wireless communication (see symbol C1) with the information processing terminal 1a and furthermore performs wireless communication (see symbol C2) with the base station 3. In other words, the communication terminal 2a has the above-mentioned first and second wireless communication functions. In addition, the communication terminal 2a has a so-called tethering function to relay communication between the information processing terminal 1a and the base station 3. Using such tethering communication, the communication terminal 2a functions as an access point used by the information processing terminal 1a to be coupled to the base station 3.

A user, not illustrated, (hereinafter, expressed as user a) moves while possessing the information processing terminal 1a and the communication terminal 2a. In the following description, a relationship between an information processing terminal and a communication terminal that performs tethering communication with this information processing terminal is arbitrarily expressed as a pair. In other words, the information processing terminal 1a and the communication terminal 2a form a pair. Note that a communication terminal and an information processing terminal having a pair relationship with each other are called a master unit and a slave unit, respectively.

A user b (not illustrated) moves while possessing an information processing terminal 1b (see filled circle) and a communication terminal 2b (see filled circle). In addition, a user c (not illustrated) moves while possessing an information processing terminal 1c (see filled circle) and a communication terminal 2c (see filled circle). The information processing terminals 1b and 1c each have the same function as that of the information processing terminal 1a, and the communication terminals 2b and 2c each have the same function as that of the communication terminal 2a.

Note that a state in which the information processing terminal 1b and the communication terminal 2b perform wireless communication with each other is indicated by arrows between the information processing terminal 1b and the communication terminal 2b. In addition, a state in which the information processing terminal 1c and the communication terminal 2c perform wireless communication with each other is indicated by arrows between the information processing terminal 1c and the communication terminal 2c.

The base station 3 performs wireless communication with each of the communication terminals 2a to 2c and performs, for example, wired communication with a core network, not illustrated. In the wireless communication between the base station 3 and each of the communication terminals 2a to 2c, a wireless communication method such as, for example, LTE or 3G is used. The core network is also called a backbone, or a carrier network and is a network that relays the base station 3 and the large-scale network NT to each other. The large-scale network NT is, for example, the Internet.

As described above, using tethering communication, the information processing terminal 1a is coupled to the large-scale network NT through the communication terminal 2a and the base station 3. A communication control device 4 controls the communication processing of the communication terminals 2a, 2b, and 2c and the communication processing of wireless communication devices 5a to 5x. Note that the lower-case "x" is an integer greater than or equal to two. The communication control device 4 is also called an information collection server.

The communication control device 4 performs communication with the wireless communication devices 5a to 5x through the core network (not illustrated) or the large-scale network NT. In addition, the communication control device 4 performs communication with the communication terminals 2a, 2b, and 2c through the base station 3.

The wireless communication devices 5a to 5x are so-called wireless LAN access points (also called access points on a communication environment's side). The wireless communication devices 5a to 5x are installed at an event site or public facility at which a large number of people gather. A circle indicated by symbol RN51a indicates the radio wave coverage area of a wireless communication device (the wireless communication device 5a in FIG. 2), in other words, the wireless communication area of the wireless communication device. The wireless communication device is able to perform wireless communication with terminals and devices existing within the wireless communication area.

Installation State of Wireless Communication Devices

Figure 3:
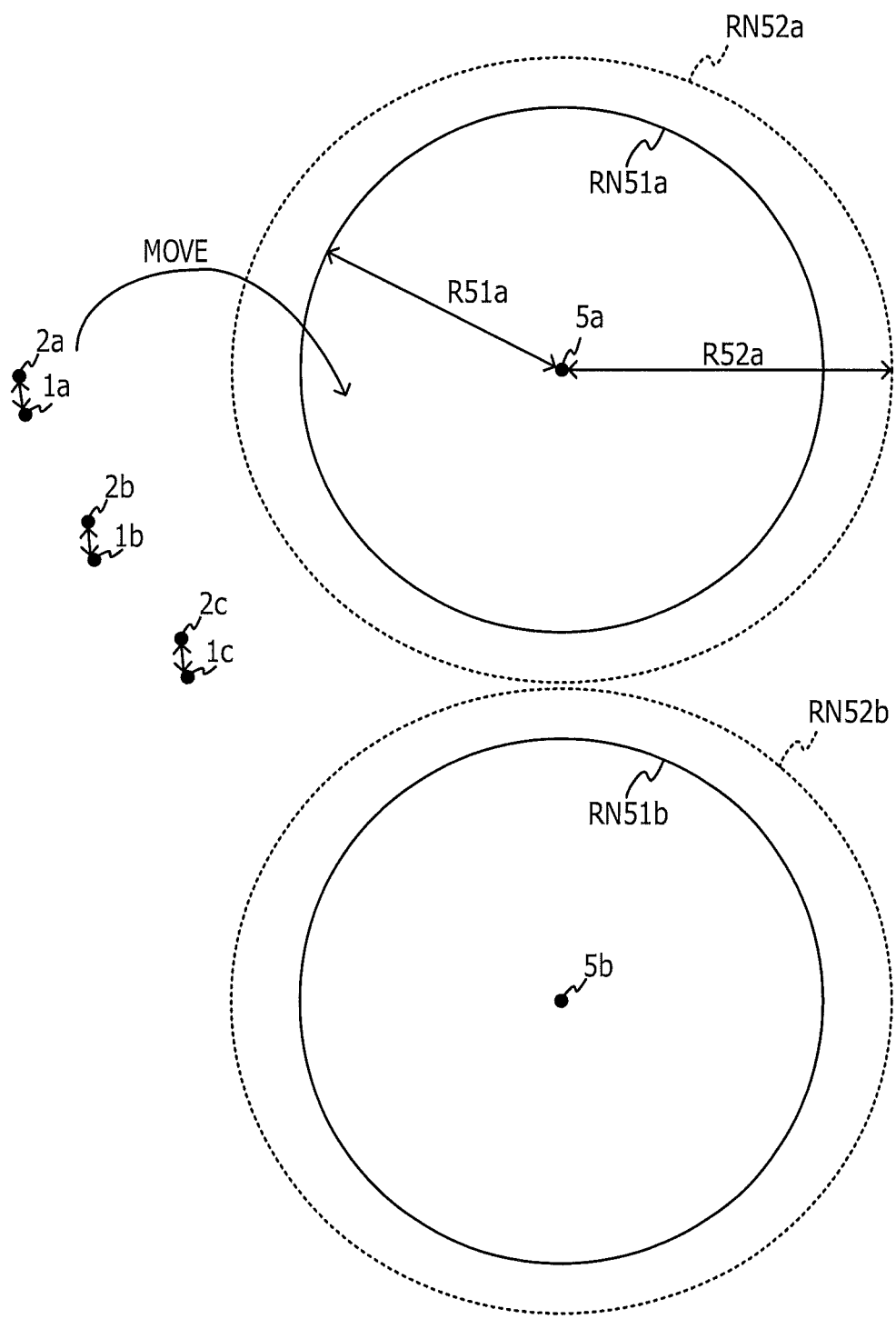
FIG. 3 is a diagram illustrating installation states of wireless communication devices in FIG. 2.

FIG. 3 is a diagram illustrating the installation states of the wireless communication devices 5a to 5x in FIG. 2. Filled circles indicated by symbols 5a and 5b in FIG. 3 schematically illustrate the arrangement locations of the wireless communication devices 5a and 5b. The wireless communication area RN51a is indicated by a circle of a radius R51a centered at the wireless communication device 5a. A circle indicated by symbol RN52a is a circle of a radius R52a centered at the wireless communication device 5a. Note that the radius R52a is larger than the radius R51a.

The circle indicated by the symbol RN52a indicates a region (hereinafter, arbitrarily expressed as an extended region) including the extended portion of the wireless communication area RN51a of the wireless communication device 5a. This extended region RN52a includes the wireless communication area RN51a. Note that the administrator of the communication control device 4 may arbitrarily set the radii R51a and R52a.

In the same way as the wireless communication device 5a, the wireless communication device 5b is able to perform wireless communication with terminals and devices existing within a wireless communication area RN51b. A circle indicated by symbol RN52b indicates an extended region including the extended portion of the wireless communication area RN51b of the wireless communication device 5b.

As illustrated in FIG. 3, the wireless communication devices 5a to 5x are installed so that the extended regions of the wireless communication areas thereof do not overlap with one another. Therefore, it is possible to suppress the occurrences of mutual interference of radio waves between the wireless communication devices.

The user a described in FIG. 2 moves around freely at various locations (for example, event sites) while possessing the information processing terminal 1a and the communication terminal 2a. Using tethering communication, the information processing terminal 1a is coupled to the large-scale network NT through the communication terminal 2a and the base station 3. By operating the information processing terminal 1a, the user a accesses the Internet and performs searches and browsing.

As described in FIG. 1, if tethering communication is performed in a plurality of communication terminals, mutual interference of radio waves occurs between the communication terminals in some cases. Owing to this mutual interference of radio waves, tethering communication throughput between a communication terminal and an information processing terminal is reduced. Furthermore, between a wireless communication device (for example, the wireless communication device 5a) and the communication terminal, mutual interference of radio waves due to, for example, transmission of the same channel occurs in some cases. Owing to this mutual interference of radio waves, wireless communication throughput between the communication terminal and the wireless communication device is reduced. Therefore, the communication control device 4 performs the following control.

First, the user a (not illustrated) who possesses the information processing terminal 1a and the communication terminal 2a moves from a current location into the wireless communication area RN51a of the wireless communication device 5a (see "move" in FIG. 2 or FIG. 3). In other words, the information processing terminal 1a and the communication terminal 2a exist within the wireless communication area RN51a of the wireless communication device 5a. Note that the information processing terminal 1a and the communication terminal 2a perform tethering communication with each other.

Figure 4:
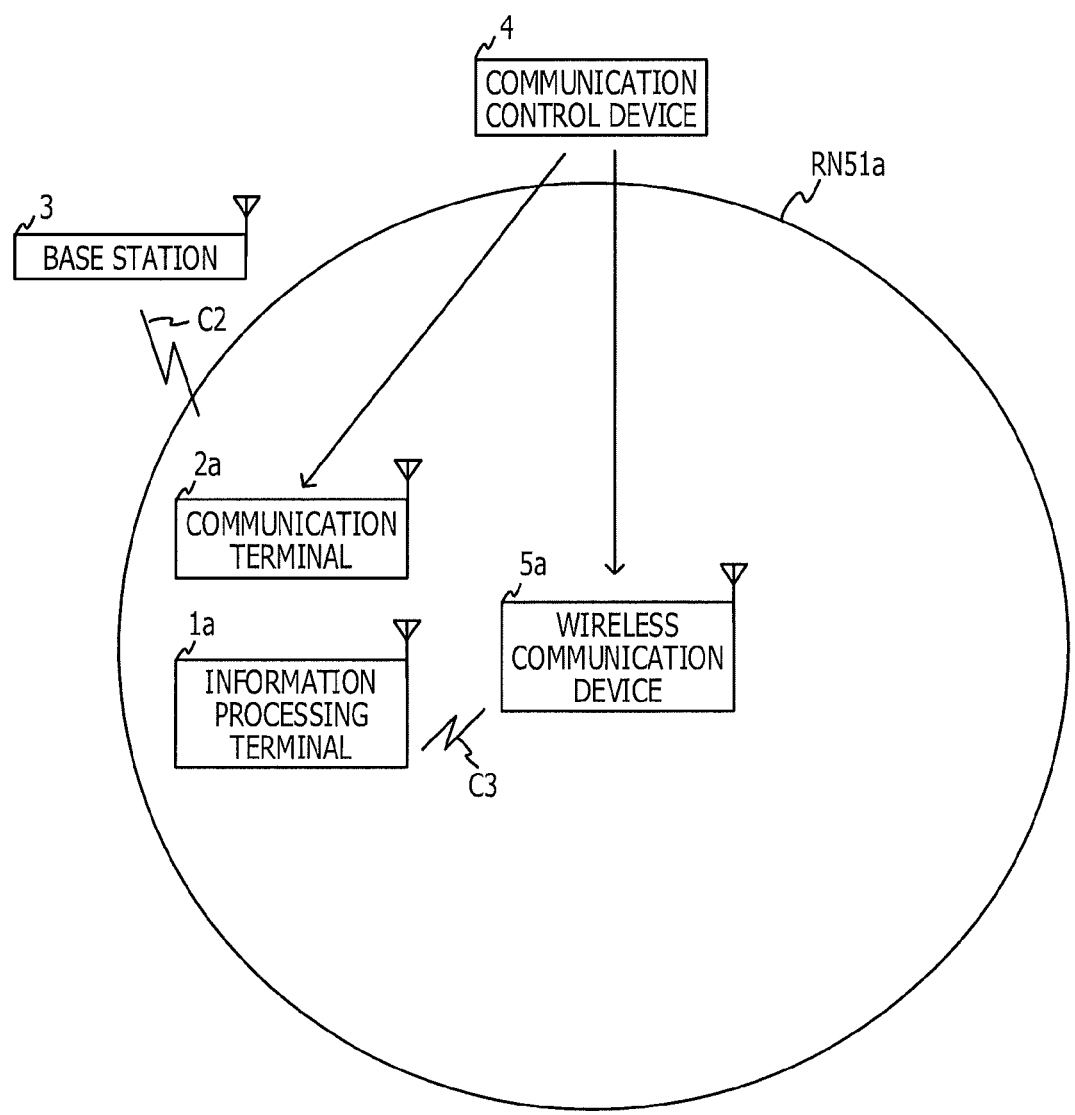
FIG. 4 is a diagram schematically illustrating a state in which an information processing terminal exists within a wireless communication area of a wireless communication device in FIG. 2.

Stopping of Tethering Communication and Wireless Communication with Wireless Communication Device FIG. 4 is a diagram schematically illustrating a state in which an information processing terminal exists within the wireless communication area of a wireless communication device in FIG. 2. The communication control device 4 causes the communication terminal 2a, which exists (is located) within the communication area RN51a of the wireless communication device 5a, to stop the currently performed tethering communication. In addition, the communication control device 4 causes the wireless communication device 5a to establish a wireless connection with the information processing terminal 1a (see symbol C3).

Note that since the information processing terminal 1a and the communication terminal 2a are possessed by the same user, the location of the information processing terminal 1a and the location of the communication terminal 2a are in effect the same. Then, the wireless communication device 5a performs wireless communication with the information processing terminal 1a and relays communication between the information processing terminal 1a and the large-scale network NT. Furthermore, the information processing terminals 1b and 1c and the communication terminals 2b and 2c exist within the wireless communication area RN51a of the wireless communication device 5a. Next, the communication control device 4 causes the communication terminals 2b and 2c, which exist within the communication area RN51a of the wireless communication device 5a, to stop the currently performed tethering communication. In addition, the communication control device 4 causes the wireless communication device 5a to establish wireless connections with the information processing terminals 1b and 1c.

As described above, by causing a communication terminal currently performing tethering communication to stop tethering communication, it is possible to suppress the occurrence of mutual interference of radio waves due to, for example, transmission of the same channel between communication terminals or between the communication terminal and a wireless communication device.

Hereinafter, the configurations of an information processing terminal, a communication terminal, a communication control device, and a wireless communication device will be described.

Configuration of Information Processing Terminal

Figure 5:
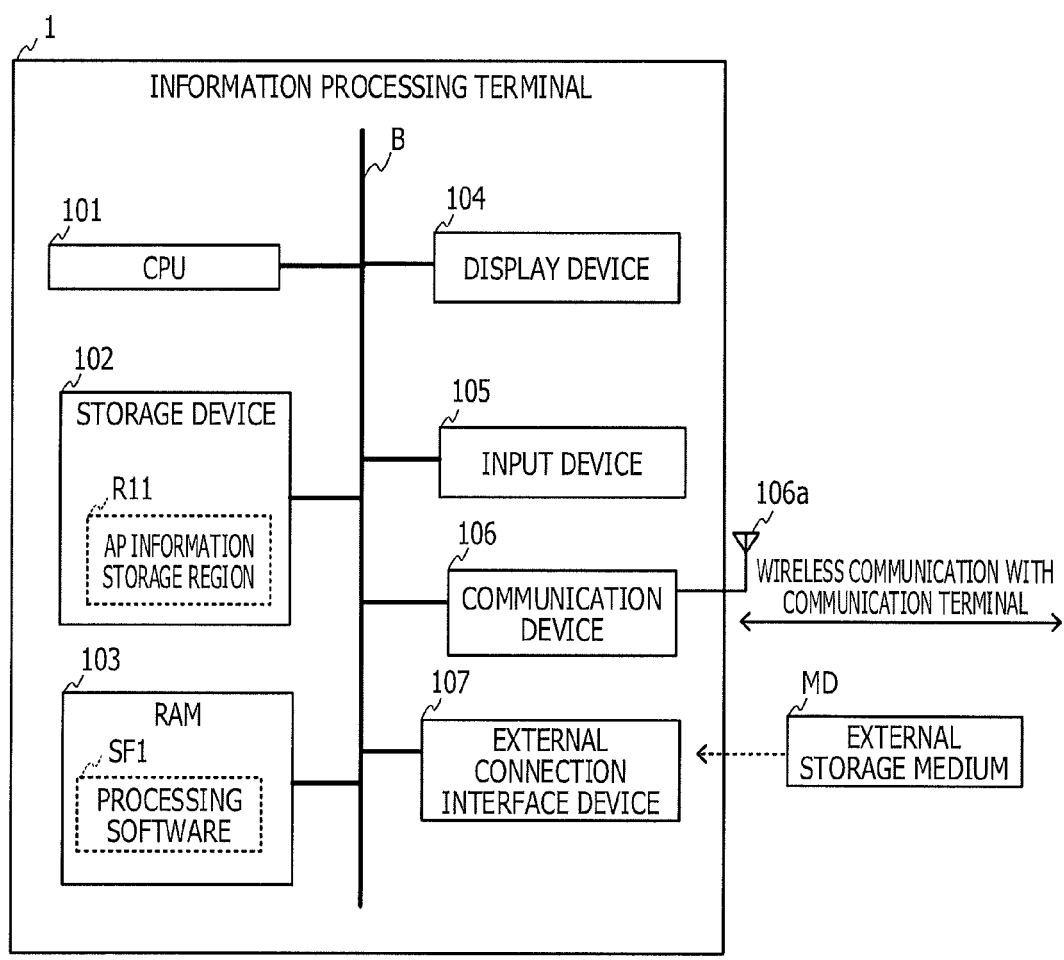
FIG. 5 is a hardware configuration diagram of an information processing terminal in FIG. 1.

First, the configuration of one of the information processing terminals in FIG. 1 will be described with reference to FIG. 5. FIG. 5 is a hardware configuration diagram of one of the information processing terminals in FIG. 1. The hardware configuration diagram of an information processing terminal 1 illustrated in FIG. 5 illustrates the hardware configuration of the information processing terminals 1a, 1b, and 1c in FIG. 2.

The information processing terminal 1 includes a CPU 101, a storage device 102, a RAM 103, a display device 104, an input device 105, a communication device 106, and an external connection interface device 107, which are coupled to a bus B. Note that CPU denotes "central processing unit", and RAM denotes "random access memory". Hereinafter, the storage device 102 is arbitrarily expressed as storage 102.

The CPU 101 is a central processing unit that controls the whole information processing terminal 1. The storage 102 is a large-capacity storage device such as, for example, a hard disk drive (HDD) or a solid state drive (SSD).

The storage 102 includes an access point (AP) information storage region R11. The AP information storage region R11 is a region that stores therein information (hereinafter, arbitrarily expressed AP information) relating to access points (hereinafter, arbitrarily expressed as APs) such as a communication terminal, and a wireless communication device, and so forth. The AP information includes a service set identifier (SSID), a password (hereinafter, arbitrarily expressed as an authentication password) desired for authenticating an access point, the type of encryption method, and so forth. Note that the AP information is also called a tethering AP.

The RAM 103 temporarily stores therein data and so forth generated (calculated) in processing executed by the CPU 101 or in each step performed by processing software SF1. The RAM 103 is a semiconductor memory such as, for example, a dynamic random access memory (DRAM).

At the time of activating the information processing terminal 1, the CPU 101 reads the executable file of the processing software SF1 from the storage 102 and develops the executable file of the processing software SF1 in the RAM 103. Note that this executable file may be stored on an external storage medium MD. The processing software SF1 executes control processing for wireless communication (tethering communication) with a paired communication terminal 2, and so forth (see FIG. 6 and FIG. 7).

The display device 104 displays various kinds of information such as images and characters on a display screen. The display device 104 is, for example, a liquid crystal panel.

The input device 105 inputs operation information to the information processing terminal 1. The input device 105 is, for example, a keyboard or a mouse.

Using, for example, wireless LAN communication to which the IEEE 802.11 standard is applied, the communication device 106 performs wireless communication with the paired communication terminal 2 through an antenna 106a.

The external connection interface device 107 is a device functioning as an interface for connecting the information processing terminal 1 and the external storage medium MD to each other. The external connection interface device 107 is, for example, a card slot or a universal serial bus (USB) port.

The external storage medium MD is a portable nonvolatile memory such as a USB memory. Note that a configuration of being coupled to a storage medium reader (not illustrated) that reads, through the external connection interface device 107, data stored on a storage medium may be adopted. This storage medium (also called a recording medium) is a portable storage medium such as, for example, a Compact Disc Read Only Memory (CD-ROM) or a Digital Versatile Disc (DVD).

Configuration of Communication Terminal

Figure 6:
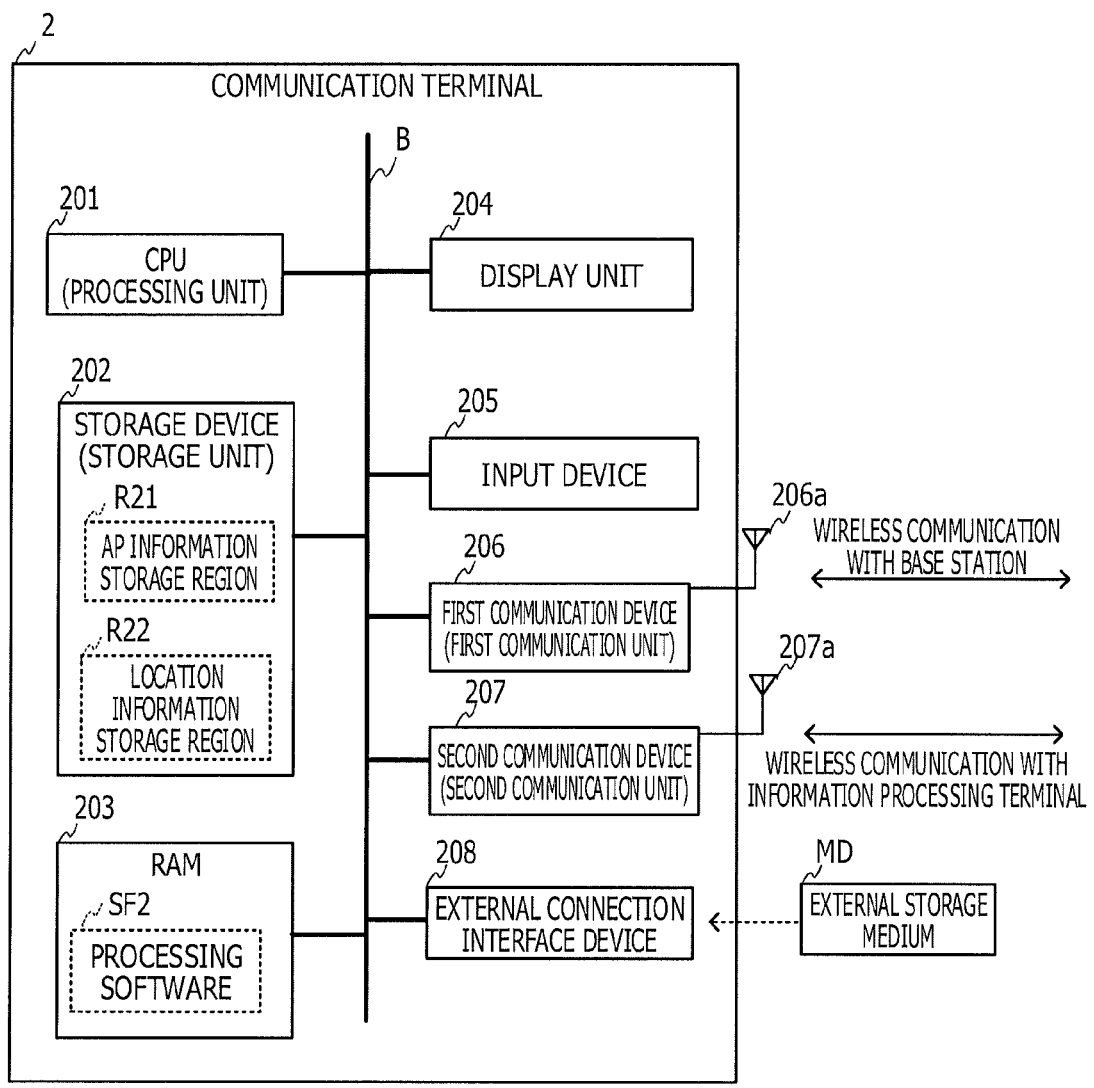
FIG. 6 is a hardware configuration diagram of a communication terminal in FIG. 1.

The configuration of a communication terminal in FIG. 1 will be described with reference to FIG. 6 and FIG. 7. FIG. 6 is a hardware configuration diagram of a communication terminal in FIG. 1. The hardware configuration diagram of the communication terminal 2 illustrated in FIG. 6 illustrates the hardware configuration of the communication terminals 2a, 2b, and 2c in FIG. 2.

The communication terminal 2 includes a CPU (processing unit) 201, a storage device (storage unit) 202, a RAM 203, a display device 204, an input device 205, a first communication device (first communication unit) 206, a second communication device (second communication unit) 207, and an external connection interface device 208, which are coupled to a bus B.

Hereinafter, the CPU (processing unit) 201 and the storage device (storage unit) 202 are arbitrarily expressed as CPU 201 and storage 202, respectively. In addition, the first communication device (communication unit) 206 and the second communication device (communication unit) 207 are arbitrarily expressed as first communication device 206 and second communication device 207, respectively.

The CPU 201 is a central processing unit (computational device) that controls the whole communication terminal 2. The storage 202 is a large-capacity storage device such as, for example, a hard disk drive or a solid state drive.

The storage 202 includes an AP information storage region R21 and a location information storage region R22. The AP information storage region R21 is a region that stores therein the AP information including an SSID, an authentication password, the type of encryption method, and so forth.

The location information storage region R22 is a region that stores therein location information indicating the location of the communication terminal 2. The location information includes, for example, latitude, longitude, and altitude. Furthermore, the storage 202 stores therein the executable file (program) of processing software SF2.

The RAM 203 temporarily stores therein data and so forth generated (calculated) in processing executed by the CPU 201 or in each step performed by the processing software SF2. The RAM 203 is a semiconductor memory such as, for example, a DRAM.

At the time of activating the communication terminal 2, the CPU 201 reads the executable file of the processing software SF2 from the storage 202 and develops the executable file of the processing software SF2 in the RAM 203. Note that this executable file may be stored on an external storage medium MD.

The display device 204 displays various kinds of information such as images and characters on a display screen. The display device 204 is, for example, a liquid crystal panel.

The input device 205 inputs operation information to the communication terminal 2. The input device 205 is, for example, a touch panel and detects coordinates indicating the contact position of an object on a display screen.

Using a wireless communication method such as, for example, LTE or 3G, the first communication device 206 performs wireless communication with the base station 3 through an antenna 206a. Specifically, the first communication device 206 performs communication with the communication control device 4 that controls a wireless communication device (for example, the wireless communication device 5a) that performs wireless communication with another terminal. Using, for example, wireless LAN communication to which the IEEE 802.11 standard is applied, the second communication device 207 performs wireless communication with the paired information processing terminal 1 through an antenna 207a. By the second communication device 207, tethering communication for relaying communication between the information processing terminal 1 and a network (for example, the large-scale network NT) is performed.

The external connection interface device 208 is a device functioning as an interface for connecting the communication terminal 2 and the external storage medium MD to each other. The external connection interface device 208 is, for example, a card slot or a USB port.

Figure 7:
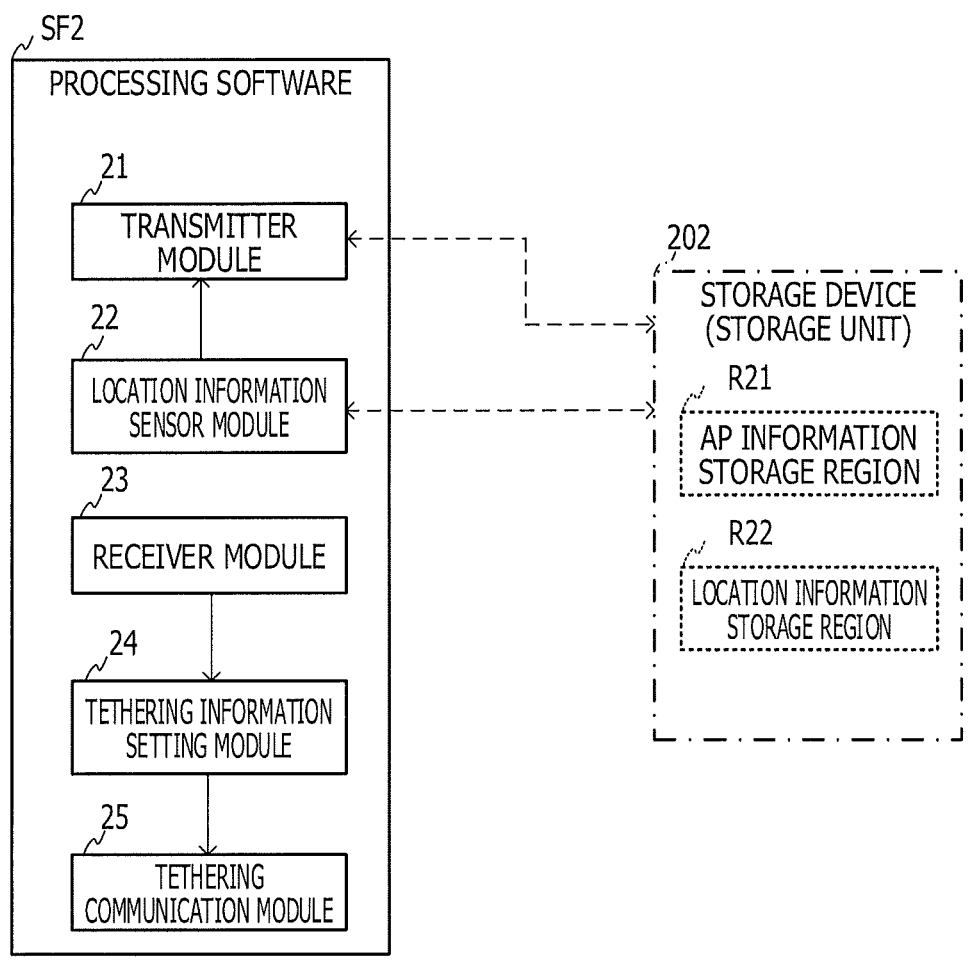
FIG. 7 is a software configuration diagram of the communication terminal in FIG. 6.

FIG. 7 is a software configuration diagram of the communication terminal 2 in FIG. 6. Note that the storage 202 having a hardware configuration is indicated by a dashed-dotted line in FIG. 6. In the following description of the software configuration diagram, solid arrows between modules schematically illustrate transmission and reception of data and instructions to modules. In addition, dashed line arrows between modules (also called units) and the storage schematically illustrate storing of data in the storage, a reference to, updating of, erasing of, or acquiring of data stored in the storage, and so forth.

The software configuration diagram of the communication terminal 2 illustrated in FIG. 7 indicates the software configuration of the communication terminals 2a, 2b, and 2c in FIG. 2.

The processing software SF2 has a tethering function and executes control processing of tethering communication with the paired information processing terminal 1, and so forth.

The processing software SF2 includes a transmitter module 21, a location information sensor module 22, a receiver module 23, a tethering information setting module 24, and a tethering communication module 25.

The transmitter module 21 transmits various kinds of data to another terminal or another device (for example, the communication control device 4). Using, for example, a global positioning system (GPS), the location information sensor module 22 detects a current location. Every time the current location changes or periodically, the location information sensor module 22 stores the location information of the communication terminal 2 in the location information storage region R22. The receiver module 23 receives various kinds of data from another terminal or another device (for example, the communication control device 4).

The tethering information setting module 24 sets, in the tethering communication module 25, a setting for starting wireless communication with the paired information processing terminal 1 and sets a setting for stopping this wireless communication, in the tethering communication module 25. The tethering communication module 25 performs tethering communication with the paired information processing terminal 1. The tethering communication module 25 receives, through the first communication device 206, communication packets transmitted from, for example, the base station 3 and transfers the communication packets to the paired information processing terminal 1 through the second communication device 207. In addition, the tethering communication module 25 receives, through the second communication device 207, communication packets transmitted from the paired information processing terminal 1 and transfers the communication packets to the base station 3 through the first communication device 206.

Configuration of Communication Control Device

Figure 8:
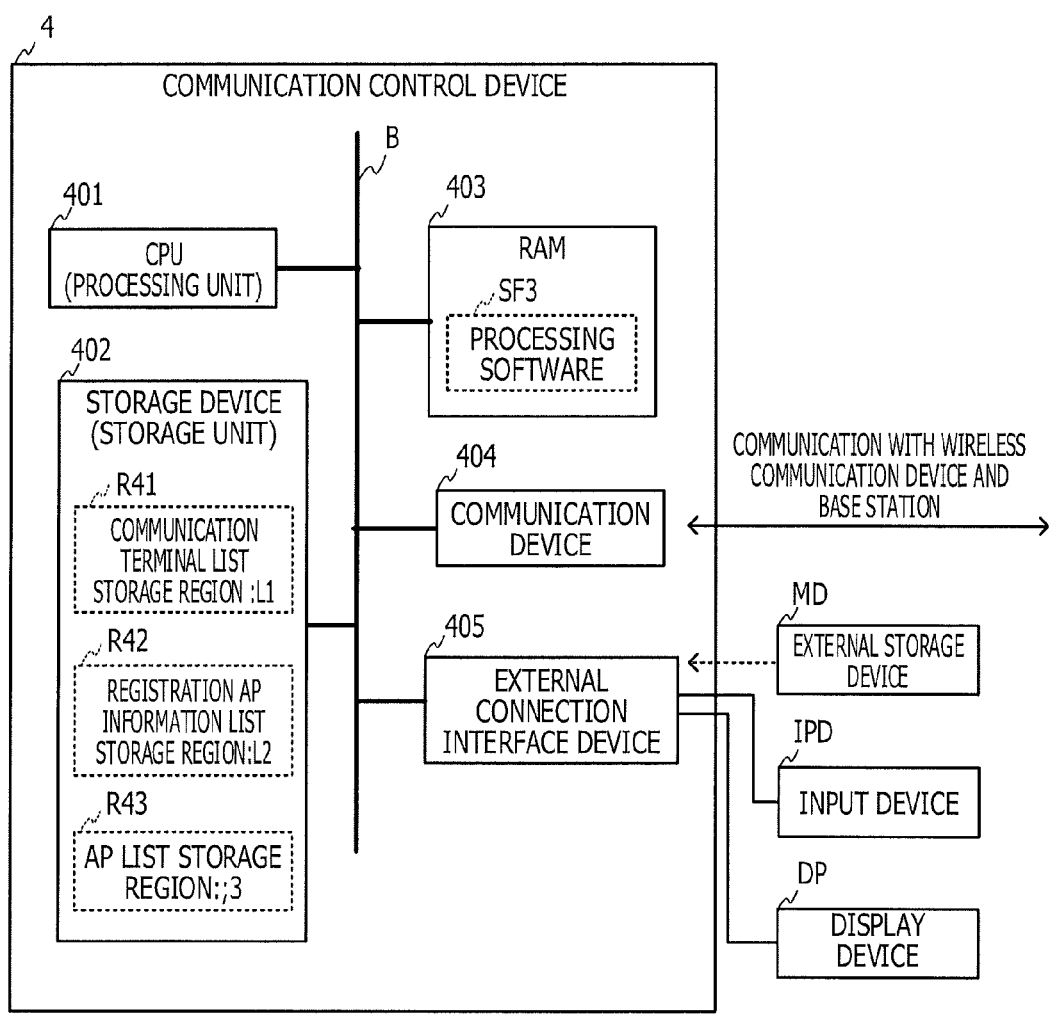
FIG. 8 is a hardware configuration diagram of a communication control device in FIG. 2.

The configuration of the communication control device 4 in FIG. 2 will be described with reference to FIG. 8 to FIG. 12. FIG. 8 is a hardware configuration diagram of the communication control device 4 in FIG. 2.

The communication control device 4 includes a CPU (processing unit) 401, a storage device (storage unit) 402, a RAM 403, a communication device 404, and an external connection interface device 405, which are coupled to a bus B. Hereinafter, the CPU (processing unit) 401 and the storage device (storage unit) 402 are arbitrarily expressed as CPU 401 and storage 402, respectively.

The CPU 401 is a central processing unit that controls the whole communication control device 4. The storage 402 is a large-capacity storage device such as, for example, a hard disk drive or a solid state drive.

The storage 402 stores therein information (also called range information) indicating the range of the wireless communication area of a wireless communication device under the control of the communication control device 4 and information indicating the range of an extended region including the extended portion of the corresponding wireless communication area. In a case of, for example, the wireless communication device 5a, the information indicating the range of the wireless communication area R51a is the location and the radius R51a of the wireless communication device 5a, and the information indicating the range of the extended region thereof is the location and the radius R52a of the wireless communication device 5a.

The storage 402 includes a communication terminal list storage region R41, a registered AP information list storage region R42, and an AP list storage region R43.

The communication terminal list storage region R41 is a region that stores therein a list (see FIG. 10) including various kinds of information relating to communication terminals and information processing terminals paired with the respective communication terminals. Note that the list is also called a table.

The registered AP information list storage region R42 is a region that stores therein a registered AP information list (see FIG. 11) including identification information for identifying communication terminals paired with respective information processing terminals that each perform wireless communication with a wireless communication device controlled by the communication control device 4.

The AP list storage region R43 is a region that stores therein a list (see FIG. 12) including information relating to wireless communication devices controlled by the communication control device 4. Furthermore, the storage 402 stores therein the executable file (program) of processing software SF3.

The RAM 403 temporarily stores therein data and so forth generated (calculated) in processing executed by the CPU 401 or in each step performed by the processing software SF3. The RAM 403 is a semiconductor memory such as, for example, a DRAM.

At the time of activating the communication control device 4, the CPU 401 reads the executable file of the processing software SF3 from the storage 402 and develops the executable file of the processing software SF3 in the RAM 403. Note that this executable file may be stored on an external storage medium MD.

The communication device 404 performs communication with the base station 3 and the wireless communication devices 5a to 5x through the large-scale network NT or the core network (not illustrated). Furthermore, the communication device 404 performs communication with the corresponding communication terminal 2 through the base station 3.

The external connection interface device 405 is a device functioning as an interface for connecting each of an input device IPD, a display device DP, and the external storage medium MD, and the communication control device 4 to each other. The external connection interface device 405 is, for example, a card slot, a USB port, or a connector for the display device DP.

Figure 9:
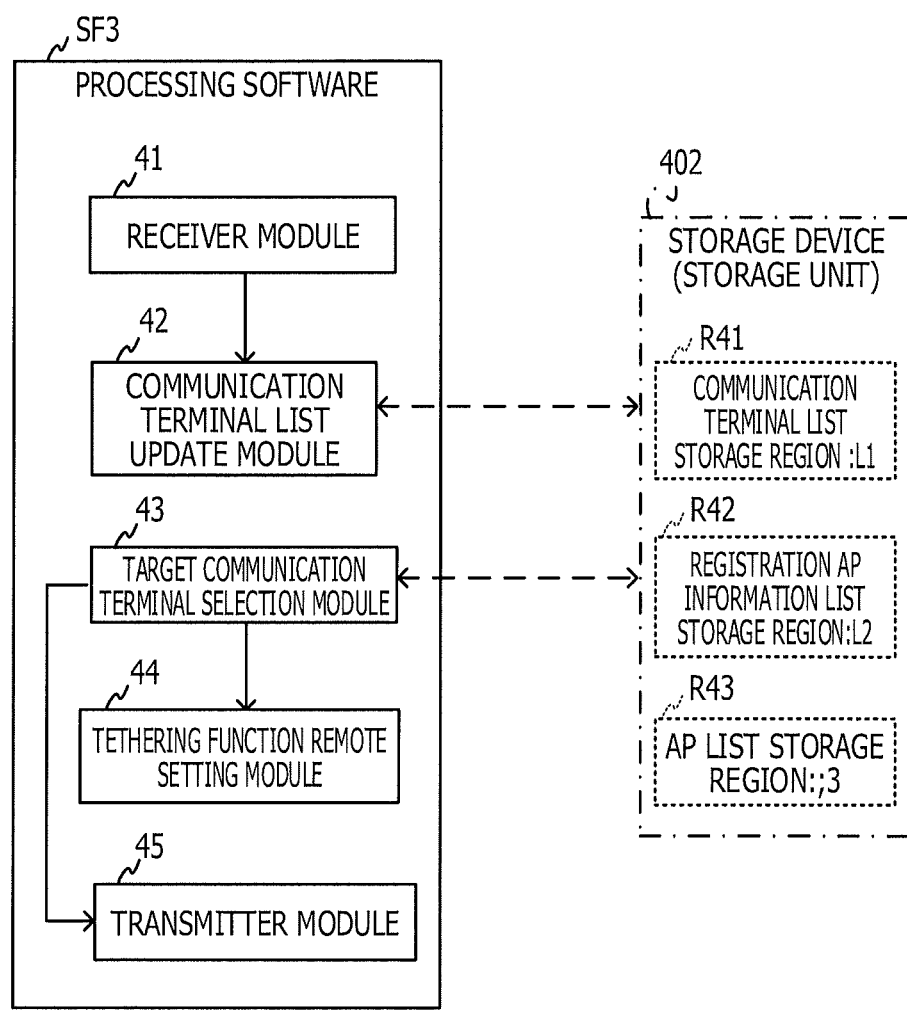
FIG. 9 is a software configuration diagram of the communication control device in FIG. 8.

FIG. 9 is a software configuration diagram of the communication control device 4 in FIG. 8. Note that the storage 402 having a hardware configuration is indicated by a dashed-dotted line in FIG. 9.

The processing software SF3 executes the control processing of the corresponding communication terminal 2 and the wireless communication devices 5a to 5x. The processing software SF3 includes a receiver module 41, a communication terminal list update module 42, a target communication terminal selection module 43, a tethering function remote setting module 44, and a transmitter module 45.

The receiver module 41 receives various kinds of data from another terminal or another device (for example, the corresponding communication terminal 2). The communication terminal list update module 42 updates a communication terminal list stored in the communication terminal list storage region R41 in the storage 402.

The target communication terminal selection module 43 selects a communication terminal from the communication terminal list stored in the communication terminal list storage region R41. The tethering function remote setting module 44 instructs (also called controls) the corresponding communication terminal 2 to start or stop tethering communication with the corresponding information processing terminal 1 paired with the corresponding communication terminal 2. The transmitter module 45 transmits various kinds of data to another terminal or another device (for example, the corresponding communication terminal 2).

List

FIG. 10 is a diagram illustrating a communication terminal list L1. The communication terminal list L1 is stored in the communication terminal list storage region R41 in the storage 402 (see symbol L1 in FIG. 8 or FIG. 9).

The communication terminal list L1 stores therein various kinds of information relating to communication terminals and respective information processing terminals paired with the communication terminals. The communication terminal list L1 includes a communication terminal identifier field, a registration destination AP field, a tethering AP information field, a current location field, and a previous location field.

The communication terminal identifier field stores therein the identifier (for example, "090-xxxx-yyyy") of the corresponding communication terminal 2 controlled by the communication control device 4. The registration destination AP field stores therein the identifier (for example, "AP1") of a wireless communication device with which the corresponding information processing terminal 1 paired with the corresponding communication terminal 2 identified by the corresponding identifier performs wireless communication. The tethering AP information field stores therein the AP information of the corresponding communication terminal 2 identified by the identifier of the corresponding communication terminal 2. In this AP information, the SSID is, for example, "SSID1", the password is, for example, "PSWD1", and the type of encryption method is, for example, "WPA2 (Wi-Fi Protected Access)". The SSID is an example of connection information used for setting a wireless connection with the corresponding information processing terminal 1 and the corresponding communication terminal 2. In other words, the SSID is an example of connection information relating to an information processing terminal, used for establishing connections with the corresponding information processing terminal 1 and access points (for example, the wireless communication device 5a and the corresponding communication terminal 2).

The current location field stores therein the current location of the communication terminal 2 identified by the corresponding identifier. The previous location field stores therein the previous location of the communication terminal 2 identified by the corresponding identifier. This previous location is the location of the corresponding communication terminal 2 stored at a storage timing one storage timing previous to a storage timing when the communication control device 4 stores the current location of the communication terminal 2 identified by the corresponding identifier.

In the communication terminal list L1, there is no restriction on storage of various kinds of information relating to communication terminals and respective information processing terminals paired with the communication terminals. In other words, in the communication terminal list L1, there is no restriction on the number of rows including the identifiers of the respective communication terminals.

The storage 402 stores therein the identification information (also called an identifier) of the corresponding communication terminal 2 that relays wireless communication between the corresponding information processing terminal 1 and the network, and the connection information used for setting a wireless connection between the corresponding information processing terminal 1 and the corresponding communication terminal 2 while associating the identification information and the connection information with each other. This connection information is used for establishing a wireless connection between the corresponding wireless communication device and the corresponding information processing terminal 1. Note that the corresponding communication terminal 2 performs tethering communication for relaying communication between the corresponding information processing terminal 1 and the network.

Furthermore, the storage 402 stores therein the identifier of the corresponding communication terminal 2 and information indicating the location of the corresponding communication terminal 2 while associating the identifier and the information indicating the location with each other.

Figure 11:
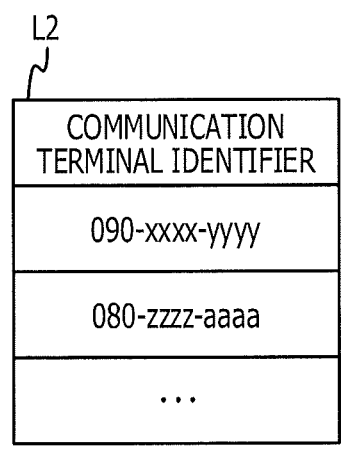
FIG. 11 is a diagram illustrating a registered AP information list.

FIG. 11 is a diagram illustrating a registered AP information list L2. The registered AP information list L2 is stored in the registered AP information list storage region R42 in the storage 402 (see symbol L2 in FIG. 8 or FIG. 9).

The communication control device 4 stores therein the registered AP information list so that the registered AP information list corresponds to each of the controlled wireless communication devices. The registered AP information list L2 in FIG. 11 indicates the registered AP information list stored so as to correspond to the wireless communication device 5a.

The registered AP information list L2 includes a communication terminal identifier field. The communication terminal identifier field stores therein identifiers each used for identifying the corresponding communication terminal 2 paired with the corresponding information processing terminal 1 that performs wireless communication with a wireless communication device (for example, the wireless communication device 5a) corresponding to the registered AP information list.

In the registered AP information list L2, there is a restriction on the number of rows including the identifiers of communication terminals. This restriction corresponds to the number of information processing terminals with which the corresponding wireless communication device is able to simultaneously perform wireless communication.

Figure 12:
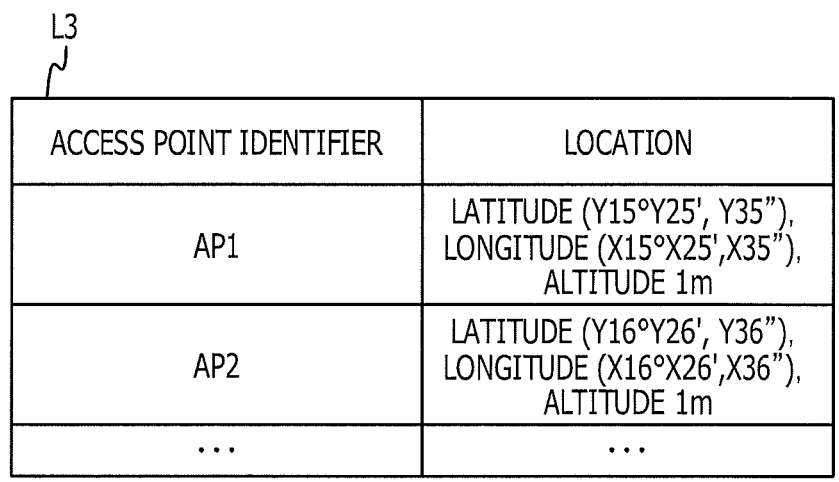
FIG. 12 is a diagram illustrating an AP list.

FIG. 12 is a diagram illustrating an AP list L3. The AP list L3 is stored in the AP list storage region R43 in the storage 402 (see symbol L3 in FIG. 8 or FIG. 9).

The AP list L3 includes an access point identifier field and a location field. The access point identifier field stores therein identifiers for identifying respective wireless communication devices controlled by the communication control device 4. The location field stores therein the locations of the wireless communication devices identified by the respective identifiers.

Configuration of Wireless Communication Device

Figure 13:
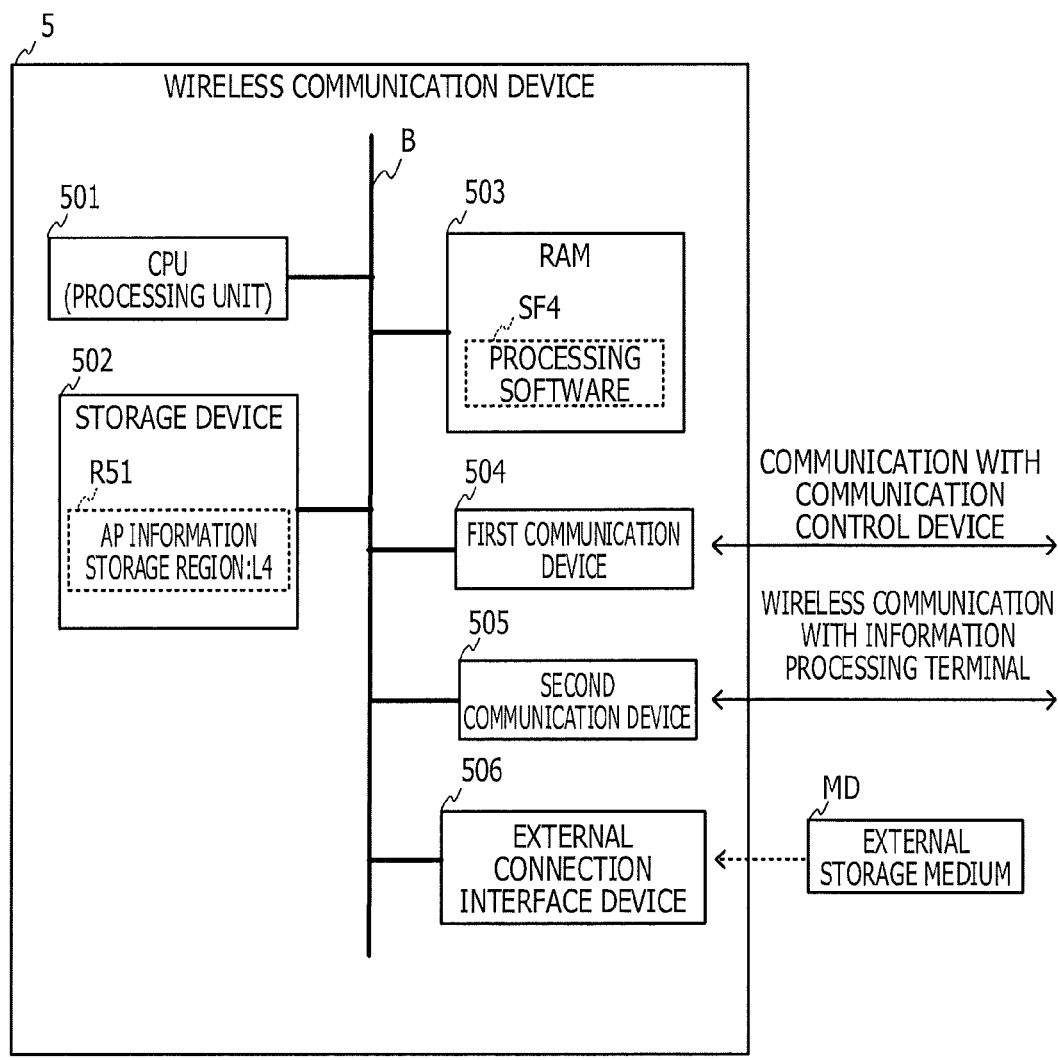
FIG. 13 is a hardware configuration diagram of a wireless communication device in FIG. 2.

The configuration of one of the wireless communication devices in FIG. 2 will be described with reference to FIG. 13 to FIG. 15. FIG. 13 is a hardware configuration diagram of one of the wireless communication devices in FIG. 2. The hardware configuration diagram of a wireless communication device 5 illustrated in FIG. 13 illustrates the hardware configuration of the wireless communication devices 5a to 5x in FIG. 2.

The wireless communication device 5 includes a CPU 501, a storage device 502, a RAM 503, a first communication device 504, a second communication device 505, and an external connection interface device 506, which are coupled to a bus B.

The CPU 501 is a central processing unit that controls the whole wireless communication device 5. The storage 502 is a large-capacity storage device such as, for example, a hard disk drive or a solid state drive.

The storage 502 includes an AP information storage region R51. The AP information storage region R51 is a region that stores therein the AP information. The AP information includes an SSID, an authentication password, the type of encryption method, and so forth.

The RAM 503 temporarily stores therein data and so forth generated (calculated) in processing executed by the CPU 501 or in each step performed by processing software SF4. The RAM 503 is a semiconductor memory such as, for example, a DRAM.

At the time of activating the corresponding wireless communication device 5, the CPU 501 reads the executable file of the processing software SF4 from the storage 502 and develops the executable file of the processing software SF4 in the RAM 503. Note that this executable file may be stored on an external storage medium MD.

Using, for example, wired communication, the first communication device 504 performs communication with the communication control device 4 and so forth through the large-scale network NT.

Using, for example, wireless LAN communication to which the IEEE 802.11 standard is applied, the second communication device 505 performs wireless communication with the corresponding information processing terminal.

The external connection interface device 506 is a device functioning as an interface for connecting the corresponding wireless communication device 5 and the external storage medium MD to each other. The external connection interface device 506 is, for example, a card slot or a USB port.

Figure 14:
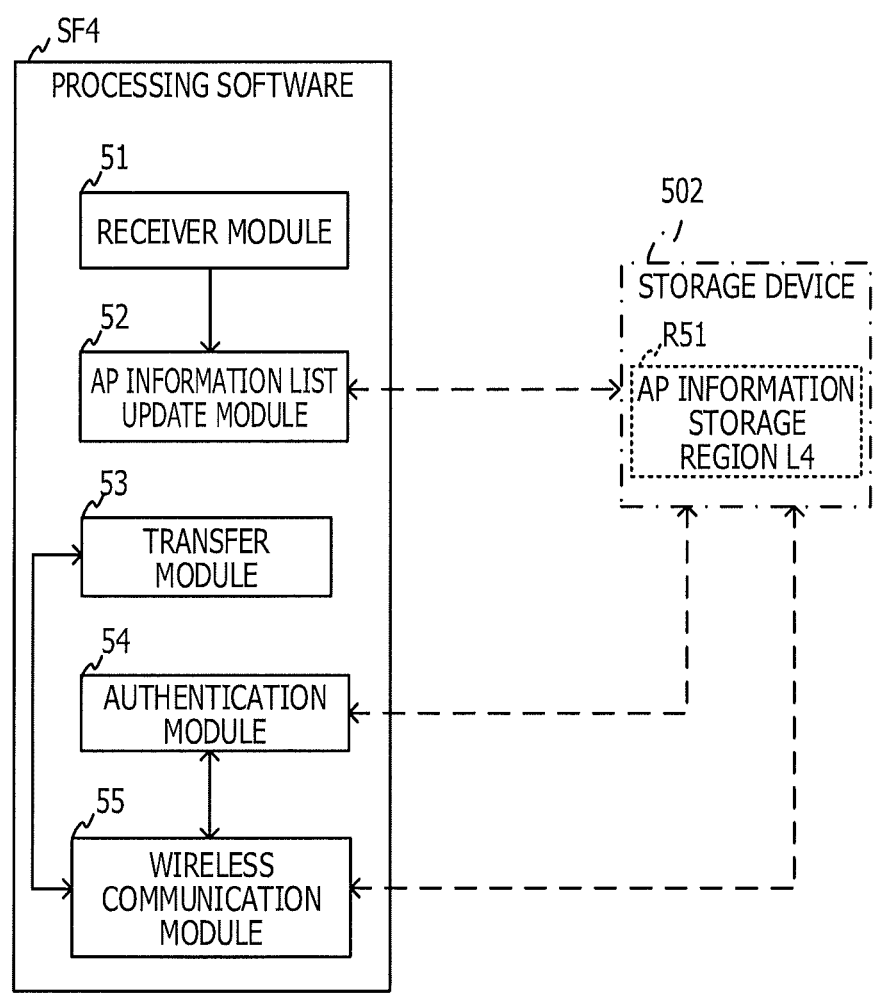
FIG. 14 is a software configuration diagram of the wireless communication device in FIG. 13.

FIG. 14 is a software configuration diagram of the wireless communication device 5 in FIG. 13. Note that the storage 502 having a hardware configuration is indicated by a dashed-dotted line in FIG. 14. The software configuration diagram of the wireless communication device 5 illustrated in FIG. 14 illustrates the software configuration of the wireless communication devices 5*a* to 5*x* in FIG. 2.

The processing software SF4 executes control processing of wireless communication with the corresponding information processing terminal 1 existing within the wireless communication area of the corresponding wireless communication device 5, and so forth. The processing software SF4 includes a receiver module 51, an AP information list update module 52, a transfer module 53, an authentication module 54, and a wireless communication module 55.

The receiver module 51 receives various kinds of data from the communication control device 4. The AP information list update module 52 updates the AP information stored in the AP information storage region R51 in the storage 502. The transfer module 53 transfers communication packets transmitted from another device (for example, a server) coupled to the large-scale network NT, to the corresponding information processing terminal 1 with which the wireless communication module 55 performs wireless communication. In addition, the transfer module 53 transfers communication packets transmitted from the corresponding information processing terminal 1 with which the wireless communication module 55 performs wireless communication, to another device coupled to the large-scale network NT.

The authentication module 54 authenticates the corresponding information processing terminal 1 existing within the communication area of the corresponding wireless communication device 5. The wireless communication module 55 establishes a wireless connection with the corresponding information processing terminal 1 existing within the communication area of the corresponding wireless communication device 5 through the second communication device 505 and controls processing for performing wireless communication with the corresponding information processing terminal 1, after the establishment.

FIG. 15 is a diagram illustrating an AP information list L4. The AP information list L4 is stored in the AP information list storage region R51 in the storage 502 (see a symbol L4 in FIG. 13 or FIG. 14).

The AP information list L4 includes a communication terminal identifier field and a tethering AP information field. The communication terminal identifier field stores therein identifiers each used for identifying the corresponding communication terminal 2 paired with the corresponding information processing terminal 1 that performs wireless communication with the corresponding wireless communication device 5. The tethering AP information field stores therein the AP information of the communication terminals 2 identified by the respective identifiers. In this AP information, the SSID is, for example, "SSID1", the password is, for example, "PSWD1", and the type of encryption method is, for example, "WPA2".

Description of Operation

The operation of the communication control device 4 in the present embodiment will be described. The target communication terminal selection module 43 in the communication control device 4 determines (also called senses) the corresponding communication terminal 2 that exists within the communication area of the corresponding wireless communication device 5 and is identified by the corresponding identifier in the storage 402 (see the communication terminal list L1 in FIG. 10) (see a step S53 in FIG. 18).

Figure 18:
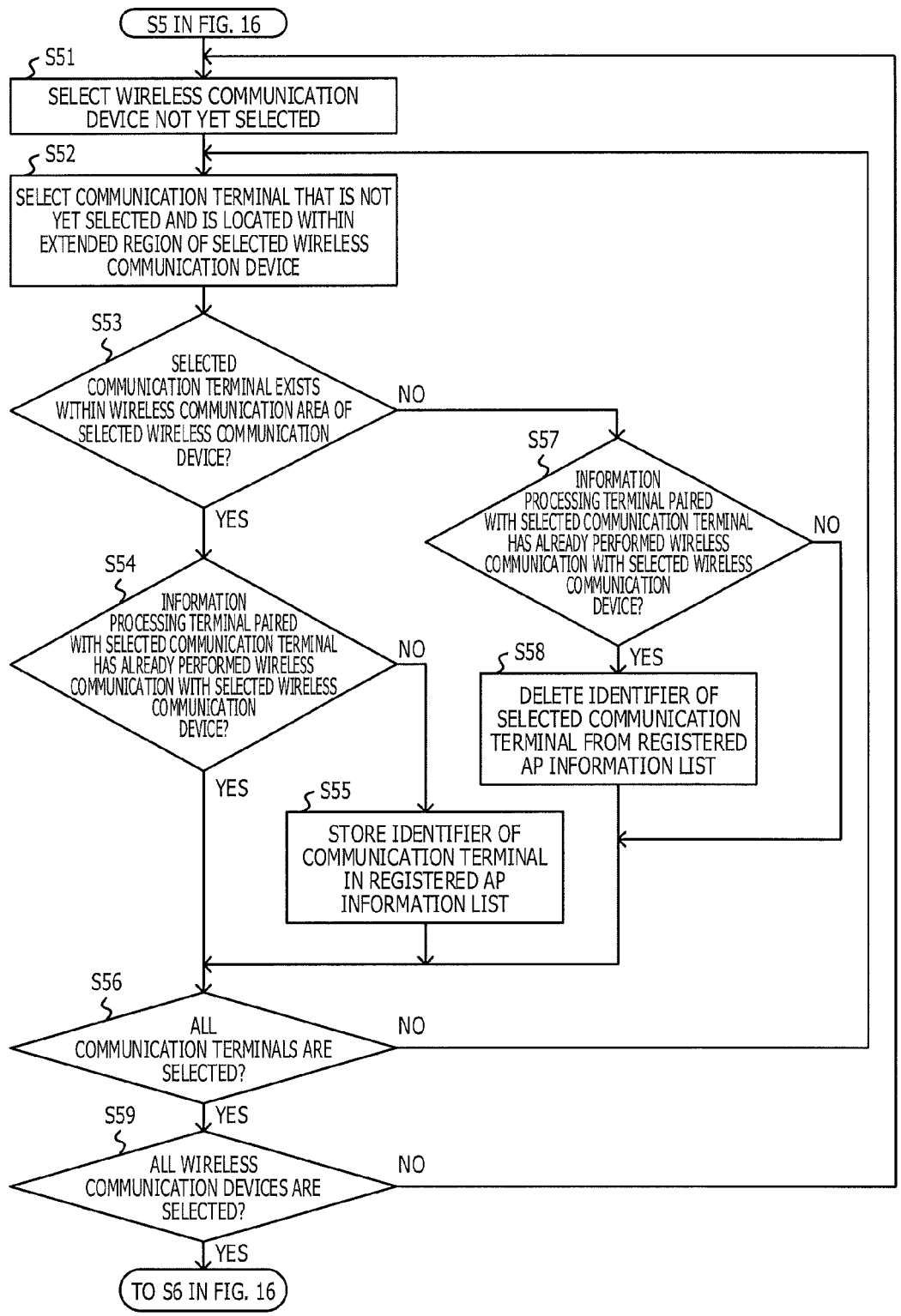
FIG. 18 is a flow diagram for explaining registered AP information list update processing in S5 in FIG. 16.

Specifically, based on the range information indicating the range of the communication area of the corresponding wireless communication device 5 and the location information of the corresponding communication terminal 2, the target communication terminal selection module 43 determines whether the communication terminal 2 identified by the corresponding identifier in the storage 402 exists within the communication area of the corresponding wireless communication device 5 (see the step S53 in FIG. 18).

In a case where, in the determination, a location indicated by the location information of the corresponding communication terminal 2 is contained within the above-mentioned range indicated by the range information, the target communication terminal selection module 43 determines that the communication terminal 2 identified by the corresponding identifier in the storage 402 exists within the communication area (see the step S53 in FIG. 18).

Figure 16:
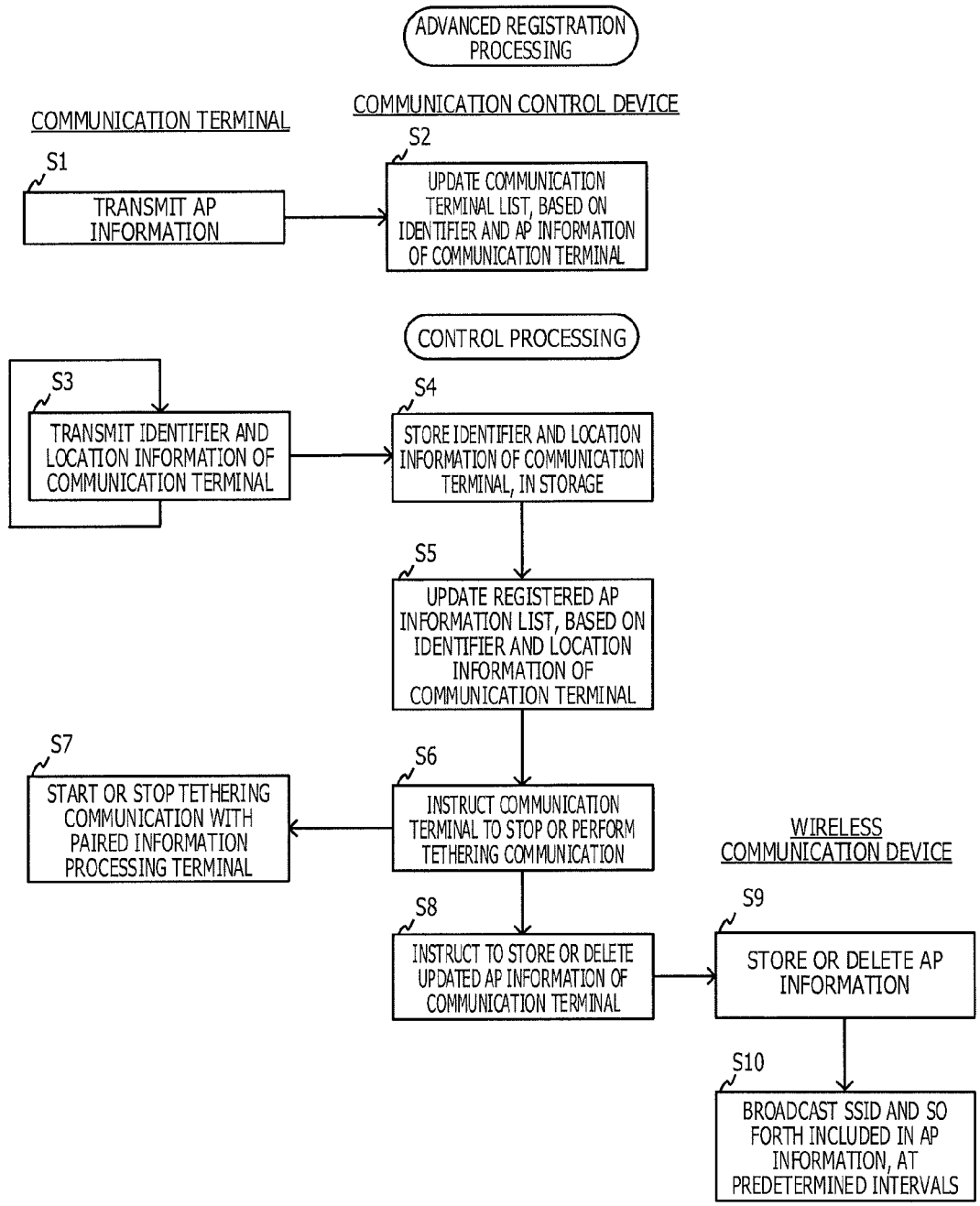
FIG. 16 is a flow diagram for explaining an operation sequence in a first embodiment.

The tethering function remote setting module 44 in the communication control device 4 instructs the corresponding communication terminal 2 to stop tethering communication, the corresponding communication terminal 2 existing within the communication area of the corresponding wireless communication device 5 and currently performing tethering communication (see a step S6 in FIG. 16).

Based on the connection information (for example, the SSID) stored in the storage 402 while being associated with the identifier of the corresponding communication terminal 2 instructed to stop tethering communication, the communication control device 4 notifies the corresponding wireless communication device 5 of a wireless connection with the corresponding information processing terminal 1 relating to the connection information, through the transmitter module 45 (see a step S8 in FIG. 16).

Specifically, the transmitter module 45 in the communication control device 4 transmits (gives notice of), to the corresponding wireless communication device 5, the connection information stored while being associated with the identifier of the corresponding communication terminal 2 existing within the communication area of the corresponding wireless communication device 5. The corresponding wireless communication device 5 broadcasts the received connection information (for example, the SSID). Using such a notification, the communication control device 4 causes the corresponding wireless communication device 5 to establish a wireless connection with the information processing terminal 1 relating to the broadcast connection information.

Whole Sequence

FIG. 16 is a flow diagram for explaining an operation sequence in the first embodiment. In the following description of the flow diagram, "Ss" (the lower-case character "s" is an integer greater than or equal to one) means a step Ss and the characters of "step" will be arbitrarily omitted.

S1 and S2 in FIG. 16

Processing operations in S1 and S2 in FIG. 16 are processing operations in which the communication control device 4 registers information set in the corresponding communication terminal 2, in the device itself in advance (advanced registration processing).

Step S1: The transmitter module 21 in the corresponding communication terminal 2 transmits, to the communication control device 4, the identifier (ID) and the AP information of the corresponding communication terminal 2. The AP information includes the SSID, the authentication password, the type of encryption method, and so forth. The identifier of the corresponding communication terminal 2 only has to be information capable of uniquely identifying the corresponding communication terminal 2. In a case where the corresponding communication terminal 2 has a telephone function, the identifier of the corresponding communication terminal 2 is, for example, a phone number. In addition to this, the identifier of the corresponding communication terminal 2 is, for example, a manufacturing number.

Step S2: Based on the received identifier and AP information of the corresponding communication terminal 2, the communication terminal list update module 42 in the communication control device 4 updates the communication terminal list L1 in FIG. 10. Note that the details of the processing operation in S2 will be described in FIG. 17.

S3 to S10 in FIG. 16

S3 to S10 in FIG. 16 are processing (control processing) in which the communication control device 4 controls tethering of the corresponding communication terminal 2 and the corresponding wireless communication device 5.

Step S3: The transmitter module 21 in the corresponding communication terminal 2 transmits, to the communication control device 4, the identifier and the location information of the corresponding communication terminal 2. The transmitter module 21 in the corresponding communication terminal 2 repeatedly executes the processing operation in S3 at predetermined transmission intervals (for example, 5 seconds, 10 seconds, 30 seconds, or the like). Note that these predetermined transmission intervals may be changed.

Step S4: The communication terminal list update module 42 in the communication control device 4 stores, in the storage 402, the identifier and the location information of the corresponding communication terminal 2, transmitted from the corresponding communication terminal 2.

Step S5: Based on the identifier and the location information of the corresponding communication terminal 2, the communication terminal list update module 42 in the communication control device 4 updates the registered AP information list L2 in FIG. 11.

Step S6: The tethering function remote setting module 44 in the communication control device 4 instructs the corresponding communication terminal 2 to stop or start tethering communication. Specifically, the tethering function remote setting module 44 in the communication control device 4 instructs the corresponding communication terminal 2, which newly exists within the wireless communication area of the corresponding wireless communication device 5 under the control thereof, to stop tethering communication with the corresponding paired information processing terminal 1. On the other hand, the tethering function remote setting module 44 instructs the corresponding communication terminal 2, which moves from within the wireless communication area of the corresponding wireless communication device 5 under the control thereof to the outside of the area, to perform tethering communication with the corresponding paired information processing terminal 1.

Step S7: In response to the instruction from the communication control device 4, the tethering information setting module 24 in the corresponding communication terminal 2 starts or stops tethering communication with the corresponding paired information processing terminal 1.

Step S8: The transmitter module 45 in the communication control device 4 instructs the corresponding wireless communication device 5 to store or delete the updated AP information of the corresponding communication terminal 2.

Step S9: The corresponding wireless communication device 5 instructed to store or delete stores the AP information in the AP information list L4 in FIG. 15 or delete the AP information from the AP information list L4. Note that the AP information list L4 is stored in the AP information storage region R51 in the storage 502.

Step S10: By broadcasting, at predetermined intervals, the SSID and so forth stored in the AP information list L4 in FIG. 15, the wireless communication module 55 in the corresponding wireless communication device 5 establishes communication with an information processing terminal.

Next, the advanced storage processing (S1 and S2) and the control processing (S3 to S10), described in FIG. 16, will be sequentially described.

Transmission of Identifier and AP Information

The transmitter module 21 in the corresponding communication terminal 2 transmits the identifier (ID) and the AP information of the corresponding communication terminal 2 to the communication control device 4 (S1).

The user of, for example, the communication terminal 2a operates the communication terminal 2a and instructs the processing software SF2 to register in advance information set in the communication terminal 2a, in the communication control device 4. In response to this instruction, the transmitter module 21 in the processing software SF2 reads the identifier of the communication terminal 2a, stored in the storage 202, and the AP information thereof stored in the AP information storage region R21 of the storage 202 and transmits the identifier and the AP information of the communication terminal 2a to the communication control device 4.

It is assumed that the identifier of the communication terminal 2a is, for example, "090-xxxx-yyyy". In addition, it is assumed that, in the AP information, the SSID is "SSID1", the password is "PSWD1", and the type of encryption method is "WPA2".

Update of Communication Terminal List

Figure 17:
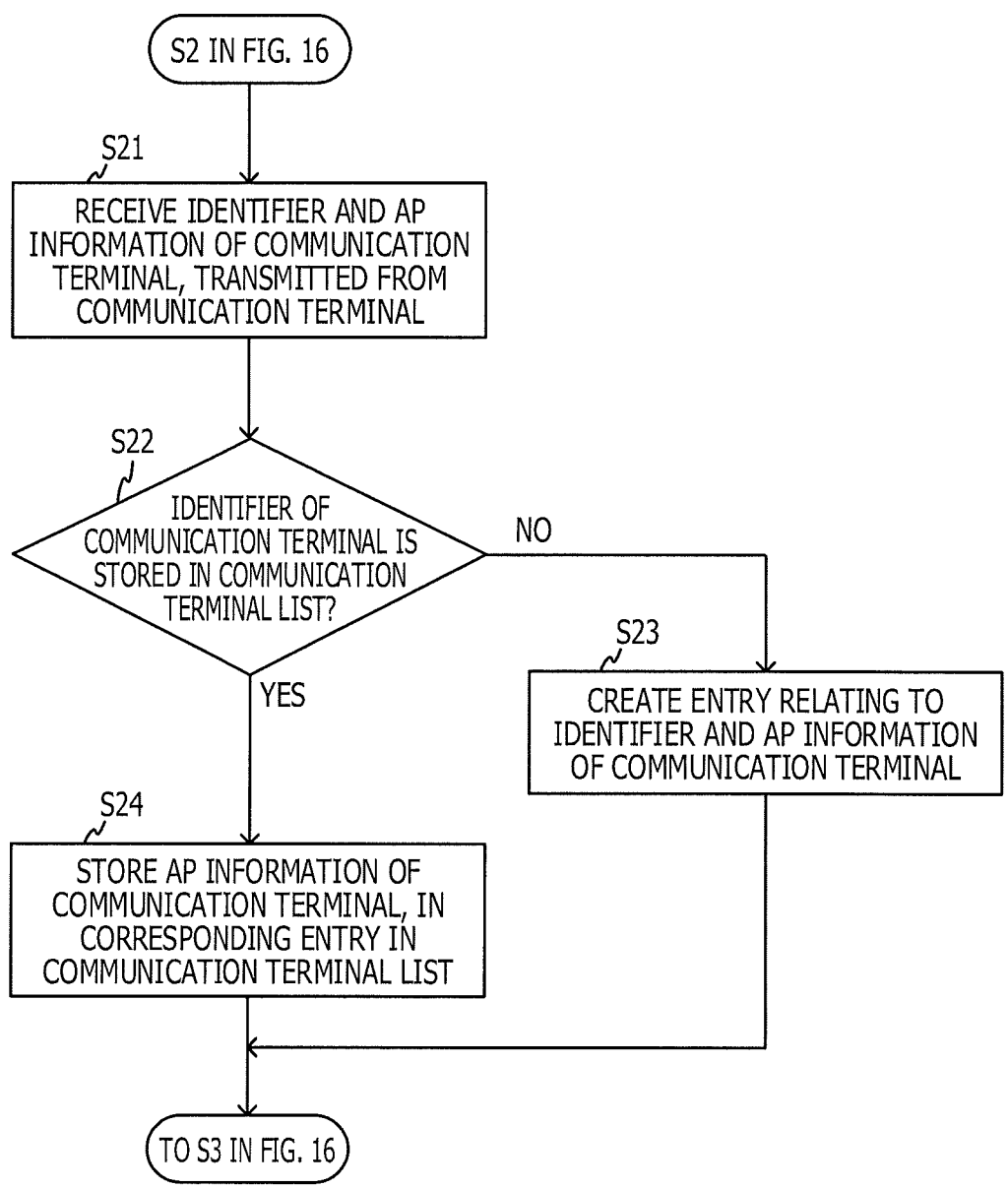
FIG. 17 is a flow diagram for explaining communication terminal list update processing in S2 in FIG. 16.

The communication terminal list update module 42 in the communication control device 4 updates the communication terminal list L1 in FIG. 10 (S2). FIG. 17 is a flow diagram for explaining the communication terminal list update processing in S2 in FIG. 16.

Step S21: The receiver module 41 in the communication control device 4 receives the identifier and the AP information of the corresponding communication terminal 2, transmitted from the corresponding communication terminal 2, and outputs the identifier and the AP information to the communication terminal list update module 42. In the above-mentioned example, the receiver module 41 receives the identifier, "090-xxxx-yyyy", and the AP information, "SSID1,PSWD1,WPA2" of the communication terminal 2a.

Step S22: The communication terminal list update module 42 determines whether the received identifier of the corresponding communication terminal 2 is stored in the communication terminal list L1 in FIG. 10. In a case where the received identifier of the corresponding communication terminal 2 is not stored in the communication terminal list L1 in FIG. 10 (S22: NO), the processing shifts to S23. In a case where the received identifier of the corresponding communication terminal 2 is stored in the communication terminal list L1 in FIG. 10 (S22: YES), the processing shifts to S24.

It is assumed that, at the present moment, in the communication terminal list L1 in FIG. 10, fields indicated by "communication terminal identifier", "registration destination AP", "AP information", "current location, and "previous location" in the first row from the top of the drawing are only indicated. In this case, the communication terminal list update module 42 determines NO in S22 and the processing shifts to S23.

Step S23: The communication terminal list update module 42 creates an entry relating to the received identifier and AP information of the corresponding communication terminal 2, in the communication terminal list L1 in FIG. 10. Note that an entry of the list indicates one row located on the lower side of the top row of the list.

In the above-mentioned example, the communication terminal list update module 42 creates the second row from the top of the drawing. The communication terminal list update module 42 stores the received identifier, "090-xxxx-yyyy", of the communication terminal 2a, in a cell at which the created second row and the communication terminal identifier field intersect with each other. The communication terminal list update module 42 stores the received AP information, "SSID1,PSWD1,WPA2", of the communication terminal 2a, in a cell at which the created second row and the tethering AP information field intersect with each other.

Note that no information is stored in a cell at which the created second row and each of the registration destination AP field, the current location field, and the previous location field intersect with each other.

Step S24: The communication terminal list update module 42 stores the received AP information of the corresponding communication terminal 2, in the corresponding entry in the communication terminal list L1 in FIG. 10.

It is assumed that, in, for example, the communication terminal identifier field of the communication terminal list L1 in FIG. 10, the received identifier, "090-xxxx-yyyy", of the communication terminal 2a is already stored. Then, the communication terminal list update module 42 stores the received AP information, "SSID1,PSWD1,WPA2", of the communication terminal 2a, in a cell at which the row in which the received identifier, "090-xxxx-yyyy", of the communication terminal 2a is stored and the tethering AP information field intersect with each other.

As above, based on the processing operations in S1 and S2 in FIG. 16 (S21 to S24 in FIG. 17), the advanced registration processing finishes.

Transmission of Location Information

The transmitter module 21 in the corresponding communication terminal 2 transmits the identifier and the location information of the corresponding communication terminal 2 to the communication control device 4 at predetermined transmission intervals (S3). The transmitter module 21 reads the identifier of the corresponding communication terminal 2, stored in the storage 202, and the location information stored in the location information storage region R22 in the storage 202 and transmits the identifier of the corresponding communication terminal 2 and the location information thereof to the communication control device 4. The transmitter module 21 in the communication terminal 2a transmits, for example, the identifier, "090-xxxx-yyyy", and the location information of the communication terminal 2a, to the communication control device 4. Here, it is assumed that, in the location information, the latitude is (Y11° Y21', Y31"), the longitude is (X11° X21', X31"), and the altitude is 1 meter. The location information includes the latitude and the longitude expressed by, for example, hours, minutes, and seconds.

Storage of Location Information

The communication terminal list update module 42 in the communication control device 4 stores, in the storage 402, the identifier and the location information of the corresponding communication terminal 2, transmitted from the corresponding communication terminal 2 (S4).

In the above-mentioned example, in the communication terminal list L1 in FIG. 10, the communication terminal list update module 42 identifies a row (the second row from the top of the drawing) in which the identifier, "090-xxxx-yyyy", of the communication terminal 2a is stored. In addition, the communication terminal list update module 42 stores, in an overwriting manner, a current location, stored in a cell at which the identified row and the current location field intersect with each other, in a cell at which the identified row and the previous location field intersect with each other. Furthermore, the communication terminal list update module 42 stores, in the cell at which the identified row and the current location field intersect with each other, the received location information (the latitude (Y11° Y21', Y31"), the longitude (X11° X21', X31"), and the altitude, 1 meter).

Instructions for Update of Registered AP Information List and Registration and Deletion of AP Information Based on processing described in FIG. 18, the communication control device 4 senses a communication terminal existing within the wireless communication area of the corresponding wireless communication device and senses a communication terminal that moves from within the wireless communication area of the corresponding wireless communication device to the outside of the wireless communication area thereof.

Using, as a trigger, for example, the reception of the identifier and the location information of the corresponding communication terminal transmitted from the corresponding communication terminal at predetermined transmission intervals (for example, 5 second, 10 seconds, 30 seconds, or the like), the communication control device 4 performs the above-mentioned sensing.

Based on the received identifier and location information of the corresponding communication terminal 2, the communication terminal list update module 42 in the communication control device 4 updates the registered AP information list L2 in FIG. 11 (S5). FIG. 18 is a flow diagram for explaining the registered AP information list update processing in S5 in FIG. 16.

Step S51: The target communication terminal selection module 43 in the communication control device 4 selects a wireless communication device not yet selected, from among one or more wireless communication devices under the control of the device itself. Specifically, the target communication terminal selection module 43 selects an access point identifier not yet selected, from the AP list L3 in FIG. 12.

Step S52: The target communication terminal selection module 43 selects, from the communication terminal list L1 in FIG. 10, a communication terminal that is not yet selected and is located within the extended region of the wireless communication device selected in S51.

From the AP list L3 in FIG. 12, the target communication terminal selection module 43 selects, for example, an access point identifier of "AP1" not yet selected. The wireless communication device identified by the access point identifier of "AP1" is the wireless communication device 5a in FIG. 2. From the AP list L3 in FIG. 12, the target communication terminal selection module 43 extracts the location information (the latitude (Y15° Y25', Y35"), the longitude (X15° X25', X35"), and the altitude, 1 meter) of the wireless communication device 5a.

In addition, from the communication terminal list L1 in FIG. 10, the target communication terminal selection module 43 selects an identifier for identifying a communication terminal located within the circle of the radius R52a, centered at the location (the latitude (Y15° Y25', Y35") and the longitude (X15° X25', X35")) of the wireless communication device 5a. In other words, from the "current location" field of the communication terminal list L1 in FIG. 10, the target communication terminal selection module 43 identifies a cell in which the location information contained within the circle of the radius R52a, centered at the location of the wireless communication device 5a. In addition, the target communication terminal selection module 43 selects the identifier of the corresponding communication terminal 2, stored in a cell at which a row including the identified cell and the communication terminal identifier field intersect with each other, in the communication terminal list L1 in FIG. 10.

It is assumed that the communication terminal located within the circle of the radius R52a, centered at the location of the wireless communication device 5a, is the communication terminal 2a. Note that the identifier of the communication terminal 2a is "090-xxxx-yyyy".

Step S53: The target communication terminal selection module 43 determines whether the communication terminal selected in S52 exists within the wireless communication area RN51a of the wireless communication device 5a selected in S51. This determination is performed based on the current location of the communication terminal selected in S52, the location of the wireless communication device 5a selected in S51, and the distance (the radius R51a) of the wireless communication area RN51a. Specifically, the target communication terminal selection module 43 matches the location information of the communication terminal selected in S52 to range information indicating the range of the wireless communication area RN51a of the wireless communication device 5a selected in S51. In addition, it is determined whether a location indicated by the location information of the communication terminal selected in S52 is contained within the wireless communication area RN51a of the wireless communication device 5a selected in S51.

In the above-mentioned example, the target communication terminal selection module 43 determines whether the communication terminal 2a selected in S52 exists within the circle of the radius R51a, centered at the location (the latitude (Y15° Y25', Y35") and the longitude (X15° X25', X35") of the wireless communication device 5a. In a case of existing therewithin (S53: YES), the processing shifts to S54. In a case of not existing therewithin (S53: NO), the processing shifts to S57.

Step S54: The target communication terminal selection module 43 determines whether the corresponding information processing terminal paired with the communication terminal selected in S52 has already performed wireless communication with the wireless communication device 5a selected in S51. Specifically, the target communication terminal selection module 43 determines whether the identifier of the communication terminal selected in S52 is stored in the communication terminal identifier field in the registered AP information list L2 in FIG. 11. In a case where the identifier of the communication terminal selected in S52 is stored in the communication terminal identifier field in the registered AP information list L2, the corresponding information processing terminal paired with the communication terminal selected in S52 has already performed wireless communication with the wireless communication device 5a selected in S51.

In a case where the identifier of the communication terminal selected in S52 is not stored in the communication terminal identifier field in the registered AP information list L2, the corresponding information processing terminal paired with the communication terminal selected in S52 does not perform wireless communication with the wireless communication device 5a selected in S51.

In the case of the above-mentioned example, it is assumed that the identifier, "090-xxxx-yyyy", of the communication terminal 2a selected in S52 is not stored in the communication terminal identifier field in the registered AP information list L2 in FIG. 11.

In a case where the corresponding information processing terminal paired with the communication terminal selected in S52 does not perform wireless communication with the wireless communication device selected in S51 (S54: NO), the processing shifts to S55. In a case where the corresponding information processing terminal paired with the communication terminal selected in S52 has already performed wireless communication with the wireless communication device selected in S51 (S54: YES), the processing shifts to S56.

Step S55: The communication terminal list update module 42 newly creates an entry (one row) in the registered AP information list L2 in FIG. 11 and stores the identifier of the communication terminal selected in S52, in a cell at which the created row and the communication terminal identifier field intersect with each other.

Next, in the communication terminal list L1 in FIG. 10, the communication terminal list update module 42 stores the identifier of the wireless communication device 5a selected in S51, in a cell at which the row in which the identifier of the communication terminal selected in S52 is stored and the registration destination AP field intersect with each other.

In the case of the above-mentioned example, the communication terminal list update module 42 stores the identifier, "090-xxxx-yyyy", of the communication terminal 2a selected in S52, in the communication terminal identifier field in the registered AP information list L2 in FIG. 11 (the second row from the top of FIG. 11). Next, in the communication terminal list L1 in FIG. 10, the communication terminal list update module 42 stores the identifier, "AP1", of the wireless communication device 5a, in a cell at which the row (the second row from the top) in which the identifier, "090-xxxx-yyyy", of the communication terminal 2a is stored and the registration destination AP field intersect with each other.

Step S56: The target communication terminal selection module 43 determines whether all the communication terminals located within the extended region of the wireless communication device selected in S51 are selected from the communication terminal list L1 in FIG. 10. In a case where all the communication terminals are selected (S56: YES), the processing shifts to S59. In a case where all the communication terminals are not selected (S56: NO), the processing returns to S52.

Based on the following S57 and S58, the communication control device 4 senses the corresponding communication terminal that moves out of the wireless communication area RN51a of the wireless communication device 5a selected in S51.

Step S57: The target communication terminal selection module 43 in the communication control device 4 determines whether the corresponding information processing terminal paired with the communication terminal selected in S52 has already performed wireless communication with the wireless communication device 5a selected in S51. Note that the processing operation in S57 is the same as the processing operation in S54.

In a case where the corresponding information processing terminal paired with the communication terminal selected in S52 does not perform wireless communication with the wireless communication device selected in S51 (S57: NO), the processing shifts to S56. In a case where the corresponding information processing terminal paired with the communication terminal selected in S52 has already performed wireless communication with the wireless communication device selected in S51 (S57: YES), the processing shifts to S58.

Step S58: The communication terminal list update module 42 deletes the identifier of the communication terminal selected in S52, from the communication terminal identifier field in the registered AP information list L2 in FIG. 11.

It is assumed that, for example, the identifier, "090-xxxx-yyyy", of the communication terminal 2a selected in S52 is stored in the communication terminal identifier field in the registered AP information list L2 in FIG. 11. In this case, the communication terminal list update module 42 determines YES in S57 and deletes the identifier, "090-xxxx-yyyy", of the communication terminal 2a from the communication terminal identifier field in the registered AP information list L2 in FIG. 11.

Furthermore, in the communication terminal list L1 in FIG. 10, the communication terminal list update module 42 stores "unregistered" in a cell at which the row including the identifier of the communication terminal selected in S52 and the registration destination AP field intersect with each other.

In addition, the communication terminal list update module 42 stores, in the storage 402, the identifier and the AP information of the communication terminal that moves from within the wireless communication area of the wireless communication device selected in S51 in FIG. 18 to the outside of the wireless communication area thereof while associating the identifier and the AP information of the corresponding communication terminal with the identifier of the corresponding wireless communication device. This identifier is the identifier deleted in S58. Then, the communication control device 4 refers to the identifier stored while being associated with the identifier of the wireless communication device selected in S51 in FIG. 18 and causes the corresponding communication terminal, which moves from within the wireless communication area of the corresponding wireless communication device to the outside of the wireless communication area thereof, to perform wireless communication with the corresponding paired information processing terminal.

Step S59: The target communication terminal selection module 43 in the communication control device 4 determines whether, from among one or more wireless communication devices under the control of the device itself, all the wireless communication devices are selected. Specifically, the target communication terminal selection module 43 determines whether all access point identifiers are selected from the AP list in FIG. 12.

In a case where all the wireless communication devices are not selected (S59: NO), the processing shifts to S51. In a case where all the wireless communication devices are selected (S59: YES), the processing shifts to S6 in FIG. 16.

As illustrated in the communication terminal list L1 in FIG. 10 and the registered AP information list L2 in FIG. 11, the communication control device 4 stores, in the storage 402, the identifier and the AP information of the corresponding communication terminal that newly exists within the wireless communication area of the wireless communication device selected in S51 in FIG. 18 while associating the identifier and the AP information of the corresponding communication terminal with the identifier of the corresponding wireless communication device. Based on this associating, the communication control device 4 manages the identifier and the AP information of the corresponding communication terminal that exists within the wireless communication area of the wireless communication device selected in S51 in FIG. 18.

Stop and Start Tethering Communication Between Communication Terminal and Information Processing Terminal The tethering function remote setting module 44 in the communication control device 4 transmits a stop control signal for instructing to stop tethering communication, to the corresponding communication terminal 2 that newly exists within the wireless communication area of the corresponding wireless communication device under the control thereof (S6).

In the above-mentioned example, the tethering function remote setting module 44 in the communication control device 4 transmits the stop control signal for instructing to stop tethering communication, to the communication terminal 2a identified by an identifier newly stored in the registered AP information list L2 in FIG. 11. As described above, the tethering function remote setting module 44 transmits, to the communication terminal 2a, a control signal that is extracted (generated) based on matching between the location information of the communication terminal selected in S52 and the range information indicating the range of the wireless communication area RN51a of the wireless communication device 5a selected in S51 and used for controlling stopping of tethering communication.

Upon receiving the stop control signal, the receiver module 23 in the corresponding communication terminal 2 outputs the stop control signal to the tethering information setting module 24. In response to the stop control signal, the tethering information setting module 24 stops tethering communication with the corresponding paired information processing terminal 1 (S7).

On the other hand, the tethering function remote setting module 44 in the communication control device 4 instructs the corresponding communication terminal 2, which moves from within the wireless communication area of the corresponding wireless communication device 5 under the control thereof to the outside of the area, to perform tethering communication. This corresponding communication terminal 2 is a communication terminal instructed to stop tethering communication by the communication control device 4.

For example, a case where the communication terminal 2a moves from within the wireless communication area of the wireless communication device 5a to the outside of the area is assumed. In a case of this assumption, the tethering function remote setting module 44 in the communication control device 4 transmits, to the communication terminal 2a, a start control signal for instructing to start tethering communication.

Upon receiving the start control signal, the receiver module 23 in the communication terminal 2a outputs the start control signal to the tethering information setting module 24. In response to the input of the start control signal, the tethering information setting module 24 starts tethering communication with the paired information processing terminal 1a.

Instruction for Storage or Deletion for Wireless Communication Device

The transmitter module 45 in the communication control device 4 transmits, to the corresponding wireless communication device 5, a storage control signal for instructing to store, in the storage 502, the identifier and the AP information of a communication terminal that newly exists within the wireless communication area of the corresponding wireless communication device 5 (S8).

In the above-mentioned example, it is assumed that the communication terminal 2a newly exists within the wireless communication area RN51a of the wireless communication device 5a. The transmitter module 45 transmits, to the wireless communication device 5a, the storage control signal for instructing to store, in the storage 502, the identifier, "090-xxxx-yyyy", and the AP information, (SSID1,PSWD1,WPA2), of the communication terminal 2a (S8).

In addition, the transmitter module 45 in the communication control device 4 transmits, to the corresponding wireless communication device 5, a deletion control signal for instructing to delete, from the storage 502, the identifier and the AP information of the corresponding communication terminal that moves from within the wireless communication area of the corresponding wireless communication device 5 to the outside of the wireless communication area (S8).

In the above-mentioned example, it is assumed that the communication terminal 2a that has existed within the wireless communication area RN51a of the wireless communication device 5a moves out of the wireless communication area RN51a. The transmitter module 45 transmits, to the wireless communication device 5a, the deletion control signal for instructing to delete the identifier, "090-xxxx-yyyy", and the AP information, (SSID1,PSWD1,WPA2), of the communication terminal 2a from the storage 502.

Figure 19:
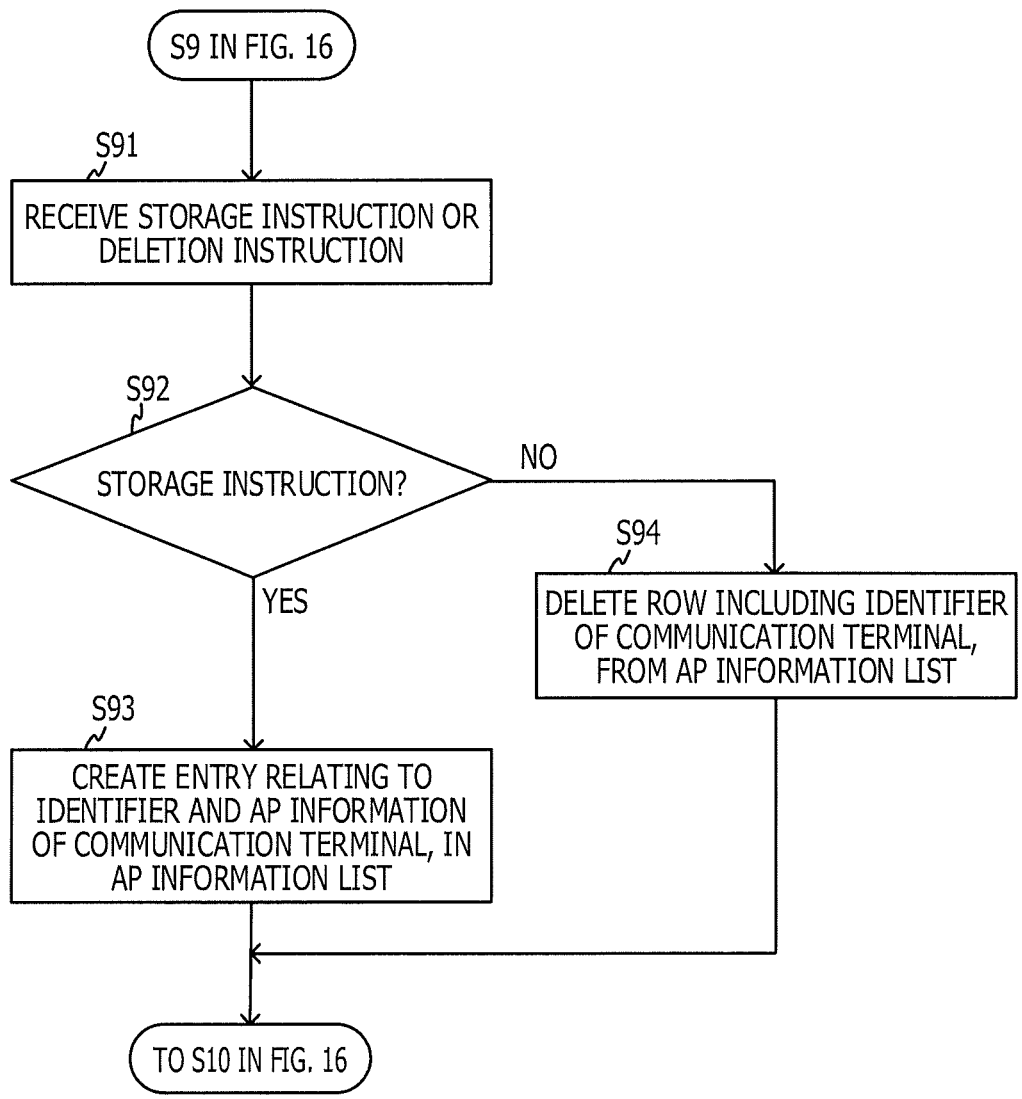
FIG. 19 is a flow diagram for explaining processing for storing AP information in the AP information list in FIG. 15 or deleting the AP information from the AP information list, in S9 in FIG. 16.

FIG. 19 is a flow diagram for explaining the processing for storing the AP information in the AP information list L4 in FIG. 15 or deleting the AP information from the AP information list L4, in S9 in FIG. 16.

Step S91: The receiver module 51 in the corresponding wireless communication device 5 receives a storage instruction or a deletion instruction. Specifically, the receiver module 51 in the corresponding wireless communication device 5 receives the storage control signal or the deletion control signal transmitted from the communication control device 4.

In addition, the receiver module 51 outputs, to the AP information list update module 52, the received storage control signal or the received deletion control signal.

Step S92: The AP information list update module 52 determines whether the received instruction is the storage instruction.

Specifically, the AP information list update module 52 determines whether the input control signal is the storage control signal or the deletion control signal.

In a case where the received instruction is the storage instruction, in other words, in a case where the input control signal is the storage control signal (S92: YES), the processing shifts to S93. In a case where the received instruction is the deletion instruction, in other words, in a case where the input control signal is the deletion control signal (S92: NO), the processing shifts to S94.

Step S93: In response to the input storage control signal, the AP information list update module 52 creates, in the AP information list L4 in FIG. 15, an entry relating to the identifier and the AP information of the corresponding communication terminal 2, included in the storage control signal.

In the above-mentioned example, the AP information list update module 52 in the wireless communication device 5a creates the second row from the top, in the AP information list L4. The AP information list update module 52 stores the identifier, "090-xxxx-yyyy", of the communication terminal 2a, included in the received storage control signal, in a cell at which the created second row and the communication terminal identifier field intersect with each other. The AP information list update module 52 stores the AP information, "SSID1,PSWD1,WPA2", of the communication terminal 2a, included in the received storage control signal, in a cell at which the created second row and the tethering AP information field intersect with each other.

Based on this storing, the connection information (the AP information including, for example, the SSID), desired for performing tethering communication between the communication terminal 2a and the information processing terminal 1a having a pair relationship with each other, turns out to be stored from the communication terminal 2a, in the wireless communication device 5a. Then, using such connection information, the wireless communication device 5a establishes a connection with the corresponding information processing terminal 1.

Step S94: In response to the input deletion control signal, the AP information list update module 52 deletes, from the AP information list L4 in FIG. 15, an entry relating to the identifier and the AP information of the corresponding communication terminal 2 included in the deletion control signal. Based on this deletion, the corresponding wireless communication device 5 stops wireless communication with the corresponding information processing terminal 1 paired with the corresponding communication terminal 2.

Communication Between Wireless Communication Device and Information Processing Terminal The wireless communication module 55 in the corresponding wireless communication device 5 broadcasts the SSID and so forth stored in the AP information list in FIG. 15, at predetermined intervals (S10). The corresponding information processing terminal 1 that newly exists within the wireless communication area of the corresponding wireless communication device 5 performs communication with the corresponding wireless communication device 5.

The wireless communication module 55 in the corresponding wireless communication device 5 periodically broadcasts, for example, a packet usually called a beacon through the second communication device 505. In the above-mentioned example, this beacon includes various kinds of information desired for communication, such as the SSID stored in the AP information list L4 in FIG. 15, a supported transmission rate, and an encryption type.

In the above-mentioned example, the wireless communication module 55 in the wireless communication device 5a periodically broadcasts the beacon (hereinafter, arbitrarily expressed as beacon a) including, for example, "SSID1" stored in the AP information list L4 in FIG. 15 and so forth.

The corresponding information processing terminal 1 that newly exists within the wireless communication area of the corresponding wireless communication device 5 receives the beacon broadcast by the corresponding wireless communication device 5. In response to the reception of the beacon, the corresponding information processing terminal 1 is coupled to the corresponding wireless communication device 5. Note that the corresponding information processing terminal 1 stops tethering communication with the corresponding paired communication terminal 2, based on S7 in FIG. 16.

In the above-mentioned example, the information processing terminal 1*a* that newly exists within the wireless communication area of the wireless communication device 5*a* receives the beacon a broadcast by the wireless communication module 55 in the wireless communication device 5*a*. Based on the received beacon a, the information processing terminal 1*a* makes an authentication request to the wireless communication device 5*a*. Here, the information processing terminal 1*a* stores, in the storage 102 in the terminal itself, the SSID (in the above-mentioned example, SSID1) and the password (in the above-mentioned example, PSWD1), referred to at the time of establishing a connection with the paired communication terminal 2*a*, while associated the SSID and the password with each other.

In a case where, for example, the SSID included in the beacon a and the SSID stored in the storage 102 coincide with each other, the information processing terminal 1*a* makes an authentication request to the wireless communication device 5*a* that transmits the beacon a.

Upon receiving the authentication request, the wireless communication module 55 in the wireless communication device 5*a* outputs the received authentication request to the authentication module 54. In response to the input of the authentication request, the authentication module 54 makes a password transmission request to the information processing terminal 1*a* through the wireless communication module 55.

Upon receiving the password transmission request, the information processing terminal 1*a* transmits, to the wireless communication device 5*a*, the SSID (in the above-mentioned example, SSID1) stored in the storage 102 in the terminal itself and the password (in the above-mentioned example, PSWD1) stored while being associated with the SSID.

Upon receiving the SSID and the password from the information processing terminal 1*a*, the wireless communication module 55 in the wireless communication device 5*a* outputs the received SSID and password to the authentication module 54. In response to the input of the SSID and the password, the authentication module 54 determines whether the input SSID and password are stored in the same row in the AP information list L4 in FIG. 15. In a case where the input SSID and password are stored in the same row, the wireless communication module 55 in the wireless communication device 5*a* establishes a connection with the information processing terminal 1*a* and then, performs wireless communication.

In the above-mentioned example, the input SSID is SSID1 and the input password is PSWD1. In addition, the input SSID and the input password are stored in the same row in the AP information list L4 in FIG. 15. Accordingly, the wireless communication module 55 in the wireless communication device 5*a* is coupled to the information processing terminal 1*a* and performs wireless communication therewith.

On the other hand, in a case where the input SSID and password are not stored in the same row, the wireless communication module 55 in the wireless communication device 5*a* does not establish a connection with the information processing terminal 1*a*.

Note that, even in a case where no authentication based on the password exists, it is possible for the wireless communication device 5*a* and the information processing terminal 1*a* to be coupled to each other. In a case where no authentication based on the password exists, the information processing terminal 1*a* makes a connection request to the wireless communication device 5*a*, based on the received beacon a. Upon receiving this connection request, the wireless communication module 55 in the wireless communication device 5*a* establishes a connection with the information processing terminal 1*a* and performs wireless communication therewith.

Then, the communication terminal 2*b* and the information processing terminal 1*b* paired with the communication terminal 2*b* (see FIG. 2 and FIG. 3) exist within the wireless communication area RN51*a* of the wireless communication device 5*a*. Furthermore, the communication terminal 2*c* and the information processing terminal 1*c* paired with the communication terminal 2*c* (see FIG. 2 and FIG. 3) exist within the wireless communication area RN51*a* of the wireless communication device 5*a*. Note that the communication terminal 2*b* performs tethering communication with the information processing terminal 1*b* and the communication terminal 2*c* performs tethering communication with the information processing terminal 1*c*.

Based on this existing in the area, as described in FIG. 16, the communication control device 4 causes the communication terminals 2*b* and 2*c* to stop wireless communication with the respective paired information processing terminals. In addition, the communication control device 4 causes the wireless communication device 5*a* to perform wireless communication with the information processing terminals 1*b* and 1*c*.

As described above, by causing communication terminals performing tethering communication to stop this tethering communication, it is possible to suppress the occurrence of mutual interference of radio waves due to, for example, transmission of the same channel. Specifically, in a case where, in the communication terminals performing tethering communication, the wireless communication areas of this tethering communication overlap with each other, mutual interference of radio waves due to, for example, transmission of the same channel occurs in some cases.

In particular, in a case where a large number of users each possess an information processing terminal and a communication terminal in a crowded site, such mutual interference of radio waves easily occurs. Note that the communication terminal of each of the users has a tethering function and performs wireless communication with the information processing terminal of the same user.

However, according to the present embodiment, the communication control device causes the above-mentioned communication terminals to stop this tethering communication, thereby reducing wireless communications traffic between the communication terminals and the information processing terminals, described above. Therefore, it is possible to suppress the occurrence of the above-mentioned mutual interference of radio waves. As a result, it is possible to suppress the reduction of wireless communication throughput between the communication terminals and the information processing terminals, due mutual interference of radio waves. Furthermore, it is possible to suppress the occurrence of the above-mentioned mutual interference of radio waves between the communication terminals and the wireless communication devices. As a result, it is possible to suppress the reduction of wireless communication throughput between the communication terminals and the wireless communication devices, due mutual interference of radio waves.

In addition, even if the communication control device causes the corresponding communication terminal to stop tethering communication, the corresponding information processing terminal paired with the corresponding communication terminal performs wireless communication with the corresponding wireless communication device. Using such wireless communication, it is possible for this corresponding information processing terminal to be coupled to the large-scale network in the same way as before the stopping of tethering communication.

In addition, the stopping of tethering communication and wireless communication between the corresponding information processing terminal and the corresponding wireless communication device are automatically executed. Therefore, a user does not have to perform an operation for operating the corresponding communication terminal to manually stop tethering communication and operating the corresponding information processing terminal to manually perform wireless communication with the corresponding wireless communication device. As a result, convenience for users is improved.

Note that there is a technology for measuring, in the installation location of a wireless communication device or the vicinity of the installation location thereof, the states of radio waves output at the time of tethering communication performed by communication terminals and identifying a communication terminal considered as the cause of the occurrence of mutual interference of radio waves (also, called the cause of interference). Furthermore, a technology for identifying, using the above-mentioned technology, a communication terminal generating mutual interference of radio waves whose intensity is greater is considered.

In such a technology, a plurality of antennas are installed and the states of radio waves measured by the antennas are combined, thereby identifying the communication terminal responsible for generating mutual interference of radio waves, based on a large amount of calculation. Note that such a technology is a method used in the design of radio waves at the time of installing access points.

However, it is difficult to apply such a technology to a wireless communication device where the number of observation points is one, in other words, a wireless communication device including one antenna. In addition, in such a technology, because of a processing speed, it is difficult to shorten the interval of time between observations of a radio wave and to identify, at short time intervals, a communication terminal causing mutual interference of radio waves. Therefore, under an environment in which users each possessing a communication terminal and an information processing terminal move with great frequency, it is difficult to identify, with great frequency, a communication terminal causing mutual interference of radio waves, by executing the above-mentioned large amount of calculation.

If hardware is enhanced in such a manner as installing a plurality of antennas for observing radio waves in a wireless communication device and utilizing a high-performance arithmetic device, the communication terminal responsible for generating mutual interference of radio waves may be identified using such a technology.

However, since a cost for enhancing the hardware is increased and man-hours for the enhancement is increased, actually it is difficult to enhance the hardware. In addition, in, for example, the case of improving the above-mentioned processing speed, it is desirable that various new technologies are developed in such a manner as studying out a new calculation method. Therefore, actually it is difficult to apply such a technology.

However, according to the present embodiment, to enhance new hardware for observing radio waves or to develop the above-mentioned new technologies is not desired.

In addition, using, as a trigger, the reception of the identifier and the location information of a communication terminal, transmitted from the communication terminal at predetermined transmission intervals (for example, 5 second, 10 seconds, 30 seconds, or the like), the communication control device of the present embodiment determines whether to stop tethering communication of the communication terminal (see FIG. 18). In other words, with a granularity able to deal with the movement velocity of a person, it is possible for the communication control device of the present embodiment to detect a communication terminal generating mutual interference of radio waves.

In addition, it is possible for the communication control device of the present embodiment to instruct the detected communication terminal to stop tethering communication. Therefore, it is possible to suppress, in real time, the occurrence of mutual interference of radio waves.

In addition, the stopping of tethering communication causes the battery consumption amount of the communication terminal to be reduced, thereby increasing a usage time.

Here, a first communication path and a second communication path are assumed. The first communication path corresponds to communication paths between the information processing terminal $1a$, the communication terminal $2a$ paired with the information processing terminal $1a$, the base station 3, and the large-scale network NT (see FIG. 2 to FIG. 4). In addition, the second communication path corresponds to communication paths between the information processing terminal $1a$, the wireless communication device $5a$, and the large-scale network NT (see FIG. 2 to FIG. 4). Furthermore, it is assumed that the throughput of the second communication path is better than that of the first communication path. In the above-mentioned assumptions, as described in the present embodiment, the throughput of the information processing terminal is becomes good in a case of performing communication with the large-scale network NT using wireless communication with the wireless communication device $5a$, compared with a case of performing communication with the large-scale network NT using tethering communication.

In addition, according to the present embodiment, the corresponding information processing terminal performs wireless communication with the corresponding wireless communication device while not performing wireless communication with the corresponding paired communication terminal. Therefore, traffic between the corresponding communication terminal and the large-scale network goes in the upstream network of the corresponding wireless communication device. As a result, it is possible to reduce the traffic amount of the core network between the base station and the large-scale network.

Note that the corresponding communication terminal 2 may transmit, to the communication control device 4, the location information of the corresponding information processing terminal 1 in place of the location information of the corresponding communication terminal 2. The reason is that since the corresponding communication terminal 2 and the corresponding information processing terminal 1 are possessed by the same user, the location of the corresponding communication terminal 2 and the location of the corresponding information processing terminal 1 are in effect the same.

In this case, the corresponding information processing terminal 1 has a GPS function and transmits, to the corresponding communication terminal 2 performing wireless communication therewith, location information indicating the location of the corresponding information processing terminal 1. The processing software SF2 in the corresponding communication terminal 2 stores the received location information in the location information storage region R22 in the storage 202. The transmitter module 22 in the corresponding communication terminal 2 transmits, as the location information of the corresponding communication terminal 2, this location information to the communication control device 4.

Second Embodiment

Since the number of channels able to be simultaneously used is limited, there is a limit to the number of information processing terminals with which the corresponding wireless communication device 5 is able to simultaneously perform wireless communication. The number of information processing terminals with which the corresponding wireless communication device 5 is able to simultaneously perform wireless communication is, for example, 10.

In addition, in a case where mutual interference of radio waves due to transmission of the same channel between communication terminals occurs, it is desirable to stop tethering communication with respect to a communication terminal where it is possible to further reduce mutual interference of radio waves.

The communication terminal where it is possible to further reduce mutual interference of radio waves is, for example, a communication terminal whose radio wave intensity at the time of tethering communication is high and whose wireless communication area is large. If tethering communication performed by such a communication terminal is stopped on a priority basis, it is possible to further suppress mutual interference of radio waves.

In what follows, for example, the following four states are assumed. The first state is that the communication terminals 2a to 2c perform tethering communication with the paired information processing terminals 1a to 1c, respectively, and the radio wave intensities of the tethering communication thereof are Pa to Pc, respectively. The second state is that the radio wave intensities are decreased in the order of Pa, Pb, and Pc (Pa>Pb>Pc). In other words, the radio wave intensity Pa is a maximum and the radio wave intensity Pc is a minimum. The third state is that the influence of the communication terminal 2a performing tethering communication with the maximum radio wave intensity Pa causes mutual interference of radio waves due to transmission of the same channel to occur between the communication terminal 2a and each of the communication terminal 2b and the communication terminal 2c. The fourth state is that the communication terminals 2a to 2c and the information processing terminals 1a to 1c exist within the wireless communication area of the corresponding wireless communication device 5.

If, in the above-mentioned four states, tethering communication performed by the communication terminal 2a whose radio wave intensity at the time of tethering communication is the highest is stopped on a priority basis, mutual interference of radio waves due to transmission of the same channel between the communication terminal 2a and each of the communication terminal 2b and the communication terminal 2c disappears.

In addition, a communication terminal where it is possible to further reduce mutual interference of radio waves is a communication terminal whose movement velocity is low. That the movement velocity is low means, for example, a case where the movement velocity is 0 (the corresponding communication terminal stops) or a case where the corresponding communication terminal moves slowly (in other words, a person with the corresponding communication terminal walks slowly (for example, at a speed of about two kilometers per hour)). Note that this low movement velocity is arbitrarily expressed as a first velocity.

Hereinafter, a case where the corresponding communication terminal moves at the first velocity is assumed (hereinafter, arbitrarily expressed as a first assumption). With the first assumption, it is assumed that tethering communication performed by the corresponding communication terminal moving at the first velocity causes mutual interference of radio waves due to transmission of the same channel to occur with another communication terminal (for example, stopping). Here, it is assumed that a time period during which mutual interference of radio waves occurs is a first time period. Note that tethering communication due to the corresponding communication terminal moving at the first velocity accounts for the occurrence of mutual interference of radio waves.

In contrast, a case where the corresponding communication terminal moves at, for example, a second velocity faster than the first velocity (hereinafter, arbitrarily expressed as a second assumption). The second velocity corresponds to a case where the person with the corresponding communication terminal moves, for example, at a run (for example, at a speed of about 10 kilometers per hour). With the second assumption, it is assumed that tethering communication performed by the corresponding communication terminal moving at the second velocity causes mutual interference of radio waves to occur with another communication terminal (for example, stopping). In a case where this mutual interference of radio waves occurs, a possibility that a time period (hereinafter, referred as a second time period) during which this mutual interference of radio waves occurs is shorter than the first period becomes high. Note that tethering communication due to the corresponding communication terminal moving at the second velocity accounts for the occurrence of mutual interference of radio waves.

The possibility that the second time period is shorter than the first period becomes high for the following reason. In other words, the reason is that the communication terminal moving at the second velocity is faster than the communication terminal moving at the first velocity slower than the second velocity and has a high possibility of moving away from the other communication terminal (for example, stopping).

Furthermore, processing for identifying a communication terminal accounting for the occurrence of mutual interference of radio waves and processing time before instructing this communication terminal to stop tethering communication are desired. Therefore, it is desirable to suppress the occurrence of mutual interference of radio waves by stopping, on a priority basis, the tethering communication of a communication terminal where it is possible to further reduce mutual interference of radio waves.

Therefore, the communication control device 4 of the second embodiment executes the following processing. In other words, the communication control device 4 sets a priority indicating the order of stopping tethering communication, in each of a plurality of communication terminals existing within the wireless communication area of the corresponding wireless communication device. In addition, the communication control device 4 causes, on a priority basis, the corresponding communication terminal whose priority is high to stop tethering communication with the corresponding paired information processing terminal.

Configuration of Communication Terminal

Figure 20:
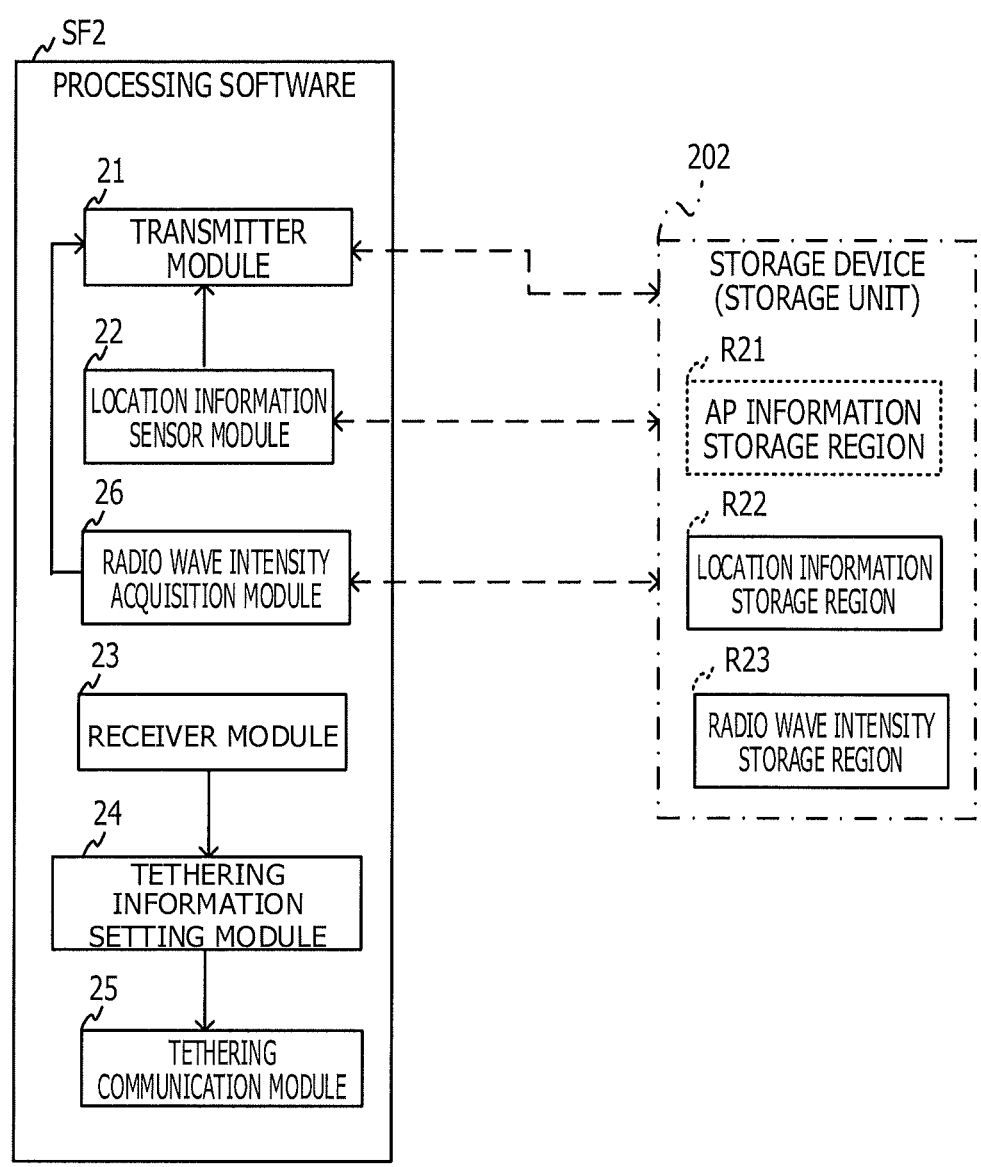
FIG. 20 is a software configuration diagram of a communication terminal in a second embodiment.

FIG. 20 is a software configuration diagram of a communication terminal in the second embodiment. Note that since the hardware configuration of the communication terminal in the second embodiment is described in the first embodiment, the description thereof will be omitted.

Processing software SF2 in the corresponding communication terminal 2 illustrated in FIG. 20 is software in which a radio wave intensity acquisition module 26 is added to the processing software SF2 in FIG. 7.

In addition to the AP information storage region R21 and the location information storage region R22, the storage 202 in FIG. 20 includes a radio wave intensity storage region R23.

The radio wave intensity acquisition module 26 in the corresponding communication terminal 2 stores, in the radio wave intensity storage region R23 in the storage 202, a radio wave intensity (also called a tethering output) at the time of performing the wireless communication, input from the second communication device 207. The second communication device 207 in the corresponding communication terminal 2 is a communication device performing tethering communication with the corresponding paired information processing terminal 1 and outputs the radio wave intensity to the radio wave intensity acquisition module 26 periodically or every time the radio wave intensity changes.

Configuration of Communication Control Device

Figure 21:
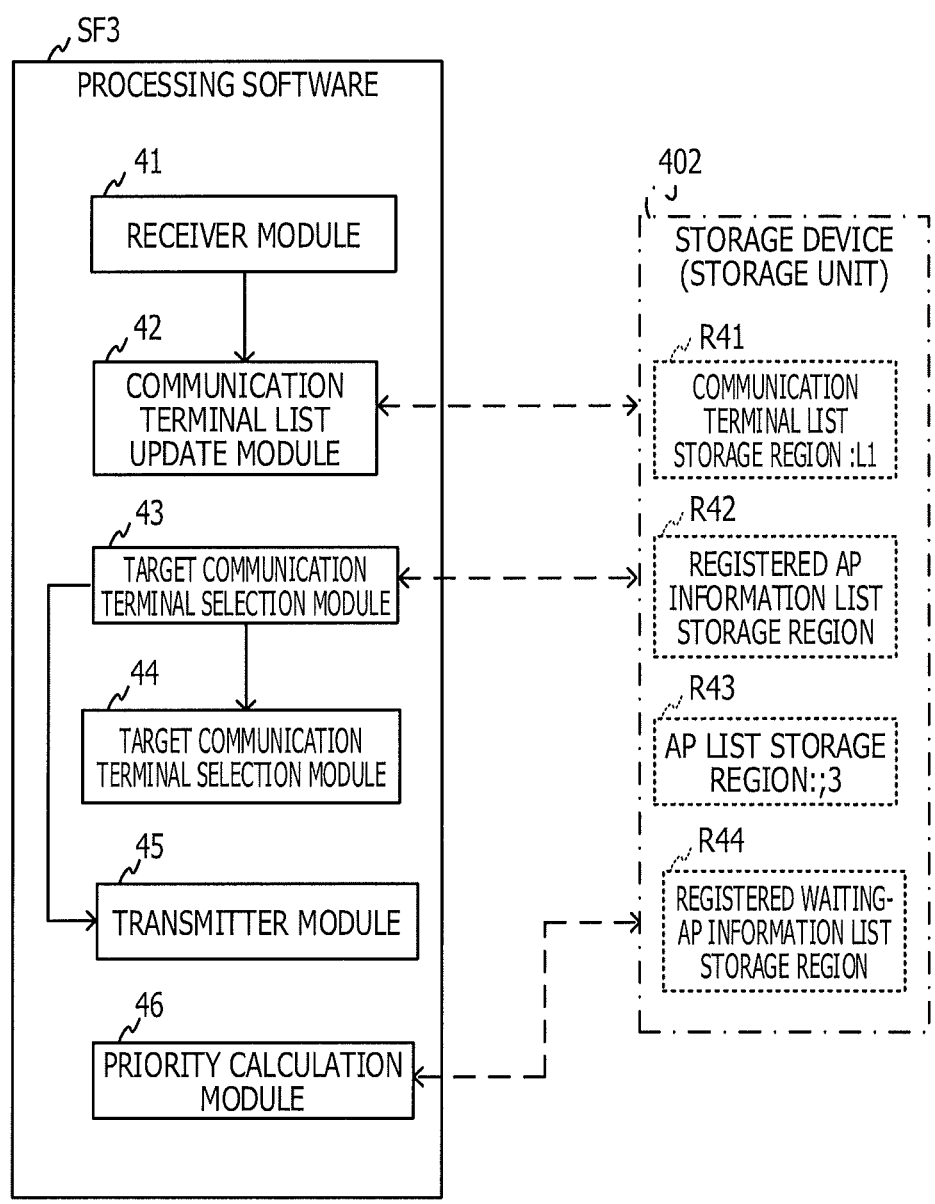
FIG. 21 is a diagram for explaining a software configuration of a communication control device in the second embodiment.

FIG. 21 is a diagram for explaining the software configuration of the communication control device in the second embodiment. Note that since the hardware configuration of the communication control device in the second embodiment is described in the first embodiment, the description thereof will be omitted.

In addition to the communication terminal list storage region R41, the registered AP information list storage region R42, and the AP list storage region R43, the storage 402 in FIG. 21 includes a registered waiting-AP information list storage region R44.

Processing software SF3 in the communication control device 4 illustrated in FIG. 21 is software in which a priority calculation module 46 is added to the processing software illustrated in FIG. 9.

With respect to each of communication terminals existing within the communication area of the corresponding wireless communication device 5, the priority calculation module 46 calculates the priority thereof indicating the order of stopping tethering communication, based on the location information and the radio wave intensity of the relevant communication terminal. In descending order of calculated priority, the tethering function remote setting module 44 causes tethering communication to be stopped, the tethering communication being performed by each of the communication terminals existing within the communication area of the corresponding wireless communication device. Note that the calculation of the priority will be described subsequent to the description of FIG. 23.

List

FIG. 22 is a diagram illustrating a communication terminal list L1'. The communication terminal list L1' is stored in the communication terminal list storage region R41 in the storage 402 (see symbol L1' in FIG. 21).

In addition to the communication terminal list L1 in FIG. 10, the communication terminal list L1' includes a radio wave intensity field. The radio wave intensity field stores therein the radio wave intensity of tethering communication based on a communication terminal identified by an identifier stored in the communication terminal identifier field.

Figure 23:
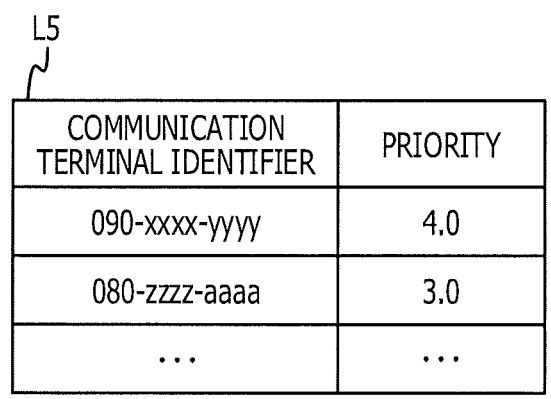
FIG. 23 is a diagram illustrating a registered waiting-AP information list.

FIG. 23 is a diagram illustrating a registered waiting-AP information list L5. The registered waiting-AP information list L5 stores therein the identifier of a communication terminal waiting until tethering communication is stopped. The registered waiting-AP information list L5 is stored in the registered waiting-AP information list storage region R44 in the storage 402 (see symbol L5 FIG. 21).

The communication control device 4 stores therein the registered waiting-AP information list so that the registered waiting-AP information list corresponds to each of the controlled wireless communication devices. The registered waiting-AP information list L5 in FIG. 23 indicates the registered waiting-AP information list registered so as to correspond to the wireless communication device 5a.

The registered waiting-AP information list L5 includes a communication terminal identifier field and a priority field. The communication terminal identifier field stores therein identifiers each used for identifying the corresponding communication terminal 2 paired with the corresponding information processing terminal 1 waiting to perform wireless communication with a wireless communication device (for example, the wireless communication device 5a) corresponding to the registered waiting-AP information list.

The priority field stores therein a priority calculated for the corresponding communication terminal 2 identified by this identifier.

Note that, in the registered waiting-AP information list L5, there is no restriction on the number of rows including the identifiers of communication terminals.

Calculation of Priority

Based on the first location information of the corresponding communication terminal 2 and second location information indicating a location previous to a location indicated by the first location information, the priority calculation module 46 calculates the movement velocity of the corresponding communication terminal 2. The first location information is location information (a current location) stored in, for example, the current location field in the communication terminal list L1' in FIG. 22. The second location information is location information (a previous location) stored in, for example, the previous location field in the communication terminal list L1' in FIG. 22.

Based on the calculated movement velocity of the corresponding communication terminal and the radio wave intensity of the corresponding communication terminal, the priority calculation module 46 calculates the priority. Specifically, the priority calculation module 46 calculates the priority so that the priority increases with an increase in the radio wave intensity of the corresponding communication terminal 2 and furthermore increases with a decrease in the movement velocity of the corresponding communication terminal 2.

The priority calculation module 46 calculates the priority in accordance with, for example, (Expression 1).

$$\text{Priority} = \text{Temporal Coefficient} \times T + \text{Output Coefficient} \times P \quad \text{(Expression 1)}$$

As (Expression 1) is explained, it is assumed that the corresponding communication terminal 2 exists within the wireless communication area of the corresponding wireless communication device 5. Not that the corresponding wireless communication device 5 is, for example, the wireless communication device 5a in FIG. 3. The corresponding communication terminal 2 is, for example, the communication terminal 2b in FIG. 3.

The above-mentioned T indicates a time period during which the corresponding communication terminal 2 is predicted to exist (be resident) within the wireless communication area of the corresponding wireless communication device 5. Specifically, the above-mentioned T is the inverse of the movement velocity of the corresponding communication terminal 2. In other words, if the movement velocity of the corresponding communication terminal 2 is low, the time period of existing within the wireless communication area of the corresponding wireless communication device 5 becomes long.

The above-mentioned P is the radio wave intensity of the corresponding communication terminal 2.

The above-mentioned temporal coefficient and the above-mentioned output coefficient are so-called weighting coefficients and may be changed. At the time of calculating the priority, by individually adjusting the above-mentioned temporal coefficient and the above-mentioned output coefficient, it is possible to determine on which of in-area time (residence time) and the radio wave intensity weight is put.

In a case where, at the time of calculating the priority, weight is put on, for example, the in-area time of the corresponding communication terminal 2, the temporal coefficient may be increased and the output coefficient may be decreased.

In contrast, in a case where, at the time of calculating the priority, weight is put on, for example, the radio wave intensity of the corresponding communication terminal 2, the temporal coefficient may be decreased and the output coefficient may be increased.

The above-mentioned T is the inverse of the movement velocity of the corresponding communication terminal 2. In other words, if the movement velocity of the corresponding communication terminal 2 becomes low, the above-mentioned T becomes large. A calculation method for this movement velocity will be described.

Based on the current location and the previous location of the corresponding communication terminal 2, the priority calculation module 46 calculates the moving distance of the corresponding communication terminal 2.

Specifically, the priority calculation module 46 calculates a time difference between time when the current location of the corresponding communication terminal 2 is received and time when the previous location of the corresponding communication terminal 2 is received. Note that this time difference may be a predetermined transmission interval to be described in S3' in FIG. 24.

The priority calculation module 46 divides the calculated moving distance by the calculated difference time and calculates the movement velocity of the corresponding communication terminal 2.

Note that the current location and the previous location of the corresponding communication terminal 2 are stored in the current location field and the previous location field, respectively, in the communication terminal list L1' in FIG. 22.

Whole Sequence

Figure 24:
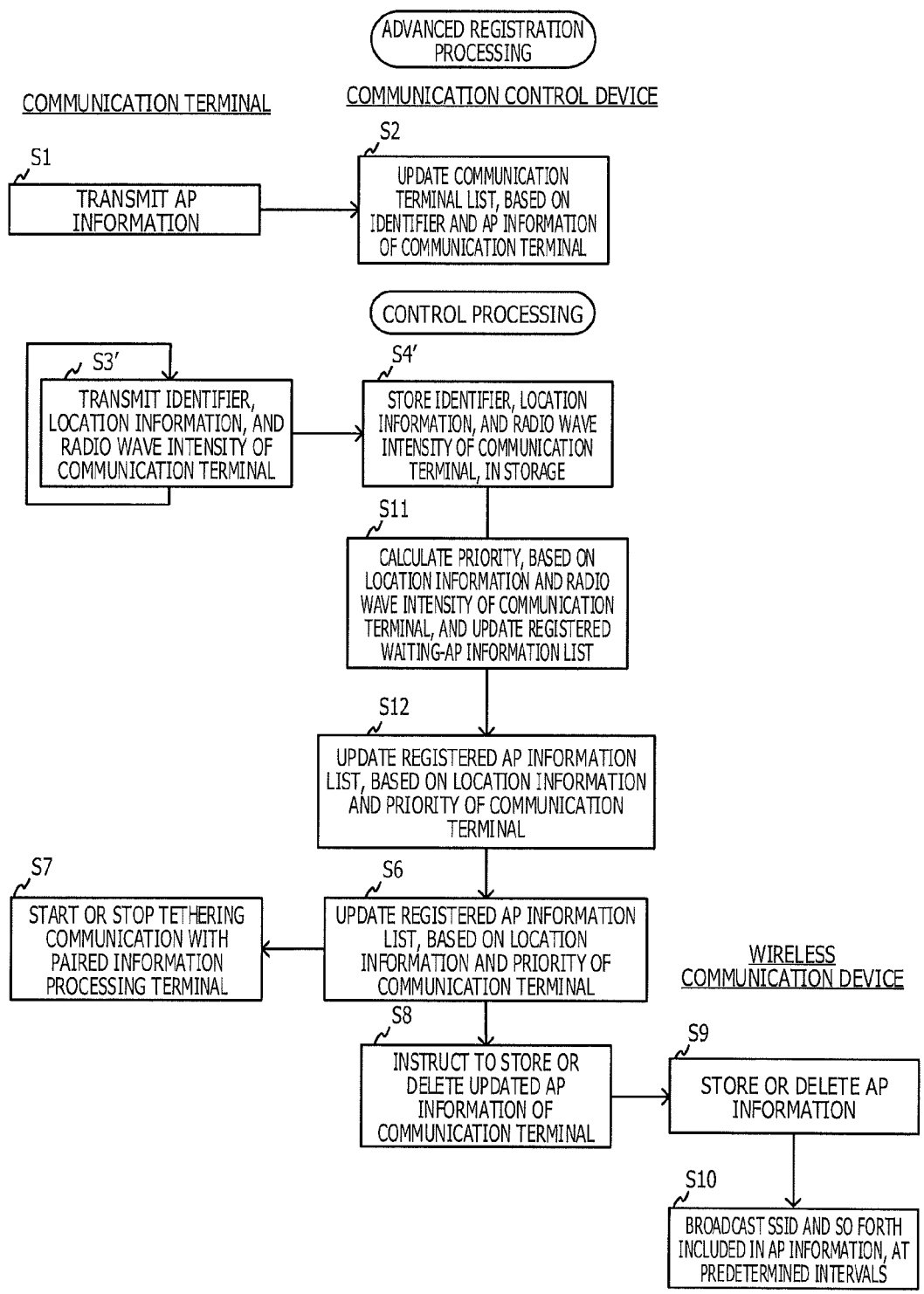
FIG. 24 is a flow diagram for explaining an operation sequence in the second embodiment.

FIG. 24 is a flow diagram for explaining an operation sequence in the second embodiment. The flow diagram in FIG. 24 is a flow diagram in which S3 and S4 in the flow diagram in the FIG. 16 are replaced with S3' and S4', respectively, and furthermore S5 in the flow diagram in FIG. 16 is replaced with S11 and S12.

Note that, at the time of explaining in S3' FIG. 24, an entry in the second row in the communication terminal list L1' in FIG. 22 is created and data is stored in each cell in the created entry. Note that the entry in the second row is a row including the identifier, "090-xxxx-yyyy", of the corresponding communication terminal.

Furthermore, an entry in the third row in the communication terminal list L1' in FIG. 22 is created. In addition, "080-zzzz-aaaa" is stored in a cell at which the entry in the third row and the communication terminal identifier field intersect with each and "unregistered" is stored in a cell at which the entry in the third row and the registration destination AP field intersect with each other. In this regard, however, no data is stored in a cell at which the entry in the third row and each of the current location field, the previous location field, and the radio wave intensity field intersect with each other.

Step S3': The transmitter module 21 in the corresponding communication terminal 2 transmits the identifier, the location information, and the radio wave intensity of the corresponding communication terminal 2 to the communication control device 4. The transmitter module 21 in the corresponding communication terminal 2 repeatedly executes the processing operation in S3' at predetermined transmission intervals. Note that the predetermined transmission intervals may be changed.

Step S4': The communication terminal list update module 42 in the communication control device 4 stores, in the storage 402, the identifier, the location information, and the radio wave intensity of the corresponding communication terminal 2, transmitted from the corresponding communication terminal 2.

Specifically, the communication terminal list update module 42 receives, from the individual communication terminals, the respective identifiers of the communication terminals, the pieces of location information indicating the respective locations of the communication terminals, respective radio wave intensities in tethering communication in the communication terminals, and the respective pieces of connection information of the information processing terminals that perform tethering communication, based on the respective communication terminals.

In addition, the communication terminal list update module 42 stores, in the storage 402, the respective identifiers of the communication terminals, the respective pieces of the locations of the communication terminals, the respective radio wave intensities of the communication terminals, and the respective pieces of connection information of the information processing terminals that perform tethering communication, based on the respective communication terminals while associating the respective identifiers of the communication terminals, the respective pieces of the locations of the communication terminals, the respective radio wave intensities of the communication terminals, and the respective pieces of connection information of the information processing terminals with one another.

Step S11: Based on the location information and the radio wave intensity of the corresponding communication terminal 2, the communication terminal list update module 42 in the communication control device 4 calculates the priority and updates the registered waiting-AP information list L5 in FIG. 23.

Step S12: Based on the location information and the priority of the corresponding communication terminal 2, the communication terminal list update module 42 in the communication control device 4 updates the registered AP information list L2 in FIG. 11.

Transmission of Location Information and Radio Wave Intensity

The transmitter module 21 in the corresponding communication terminal 2 transmits, to the communication control device 4, the identifier, the location information, and the radio wave intensity of the corresponding communication terminal 2 at predetermined transmission intervals (S3'). The transmitter module 21 reads the identifier of the corresponding communication terminal 2, stored in the storage 202, and the location information stored in the location information storage region R22 in the storage 202. Furthermore, the transmitter module 21 reads the radio wave intensity stored in the radio wave intensity storage region R23 in the storage 202.

The transmitter module 21 transmits, to the communication control device 4, the identifier, the location information, and the radio wave intensity of the corresponding communication terminal 2. The transmitter module 21 in the communication terminal 2b transmits, for example, the identifier, the location information, and the radio wave intensity of the communication terminal 2b, to the communication control device 4. This identifier is "080-zzzzz-aaaa". In the location information, the latitude is (Y13° Y23', Y33"), the longitude is (X13° X23', X33"), and the altitude is 1 meter. The radio wave intensity is 5 (mW).

Storage of Location Information and Radio Wave Intensity

The communication terminal list update module 42 in the communication control device 4 stores, in the storage 402, the identifier, the location information, and the radio wave intensity of the corresponding communication terminal 2 transmitted from the corresponding communication terminal 2 (S4'). Note that since the storage processing for the location information is described in the first embodiment, the description thereof will be omitted.

The storage of the radio wave intensity will be described. In the above-mentioned example, in the communication terminal list L1' in FIG. 22, the communication terminal list update module 42 identifies a row (the third row from the top of the drawing) in which the identifier, "080-zzzz-aaaa", of the communication terminal 2b is stored. In addition, the communication terminal list update module 42 stores the radio wave intensity, "5 (mW)", in a cell at which the identified row and the radio wave intensity field intersect with each other.

Figure 25:
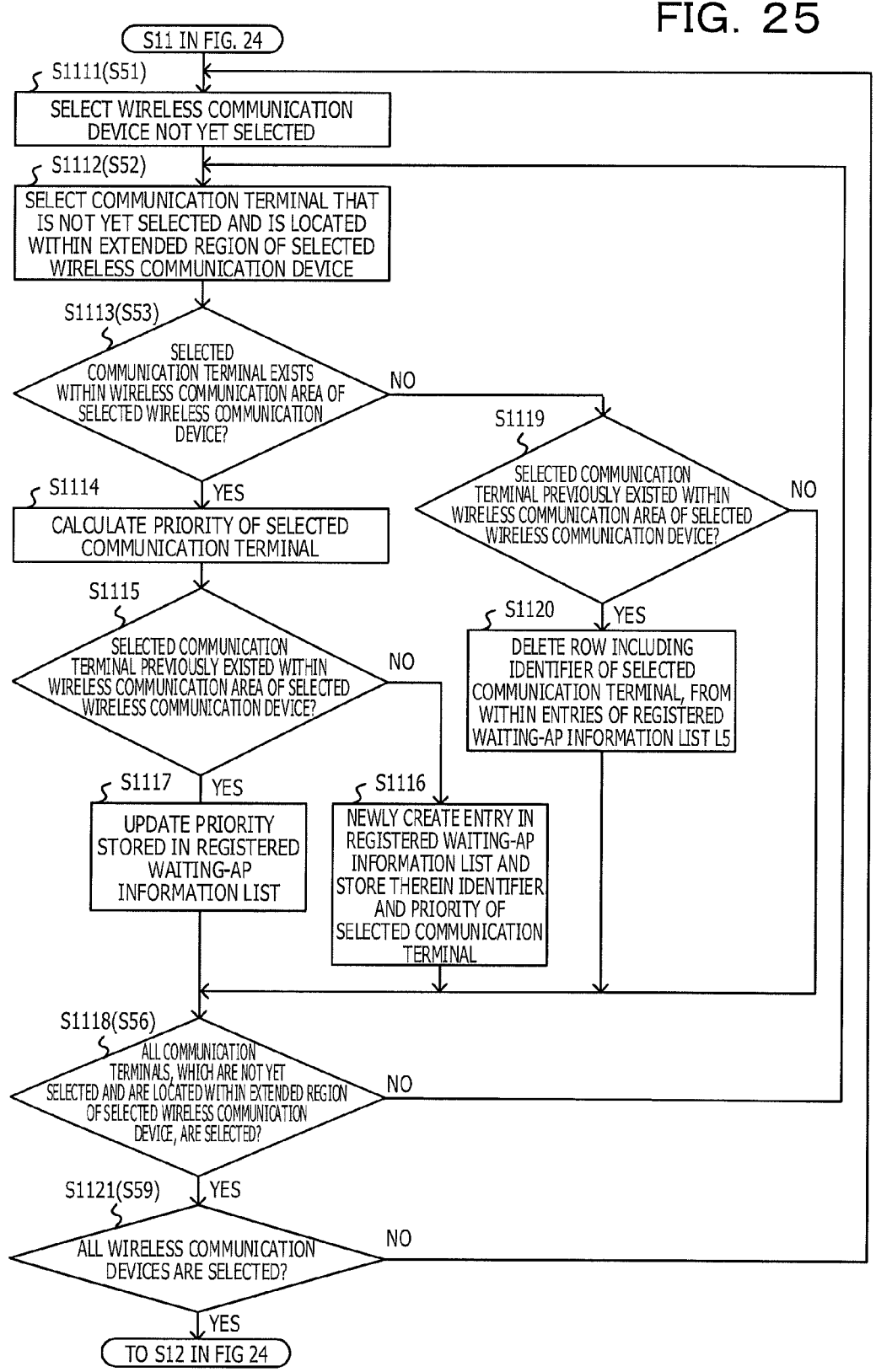
FIG. 25 is a flow diagram for explaining registered waiting-AP information list update processing in S11 in FIG. 24.

Calculation of Priority, Update of Registered AP Information List, and Update of Registered Waiting-AP Information List Based on processing to be described in FIG. 25, the priority calculation module 46 in the communication control device 4 updates the registered waiting-AP information list L5 in FIG. 23 (S11). Specifically, based on the processing to be described in FIG. 25, the priority calculation module 46 calculates, as desired, the priority of the corresponding communication terminal existing within the wireless communication area of the corresponding wireless communication device 5.

FIG. 25 is a flow diagram for explaining the registered waiting-AP information list update processing in S11 in FIG. 24. Since S1111 to S1113, S1118, and S1121 in FIG. 25 are the same as S51 to S53, S56, and S59, respectively, in FIG. 18, the descriptions thereof will be omitted.

In a case where the communication terminal selected in S1112 exists within the wireless communication area of the wireless communication device selected in S1111 (S1113: YES), the processing shifts to S1114. In a case of not existing therewithin (S1113: NO), the processing shifts to S1117.

S1114: Based on the current location, the previous location, and the radio wave intensity of the communication terminal selected in S1112, the priority calculation module 46 calculates the priority of the communication terminal selected in S1112, in accordance with the above-mentioned (Expression 1).

Step S1115: The target communication terminal selection module 43 determines whether the communication terminal selected in S1112 previously existed within the wireless communication area of the wireless communication device selected in S1111. In other words, the target communication terminal selection module 43 determines whether the communication terminal selected in S1112 newly existed within the wireless communication area of the wireless communication device selected in S1111.

Specifically, the target communication terminal selection module 43 determines whether the identifier of the communication terminal selected in S1112 is stored in the communication terminal identifier field in the registered waiting-AP information list L5 in FIG. 23. In a case where the identifier of the communication terminal selected in S1112 is stored in the communication terminal identifier field in the registered waiting-AP information list L5, the relevant communication terminal previously existed within the relevant wireless communication device.

In a case where the communication terminal selected in S1112 did not previously exist within the wireless communication area of the wireless communication device selected in S1111 (S1115: NO), the processing shifts to S1116. In a case where the communication terminal selected in S1112 has already existed within the wireless communication area of the wireless communication device selected in S1111 (S1115: YES), the processing shifts to S1117.

In the case of the above-mentioned example, it is assumed that the identifier, "080-zzzz-aaaa", of the communication terminal 2b selected in S1112 is not stored in the communication terminal identifier field in the registered waiting-AP information list L5 in FIG. 23.

Step S1116: The communication terminal list update module 42 newly creates an entry (one row) in the registered waiting-AP information list L5 in FIG. 23 and stores the identifier of the communication terminal selected in S1112, in a cell at which the created row and the communication terminal identifier field intersect with each other. Next, in a cell at which the created row and the priority field intersect with each other, the communication terminal list update module 42 stores the priority of the relevant communication terminal, calculated in S1114.

In the case of the above-mentioned example, the communication terminal list update module 42 stores the identifier, "080-zzzz-aaaa", of the communication terminal 2b selected in S1112, in the communication terminal identifier field in the registered waiting-AP information list L5 in FIG. 23 (see the second row from the top in FIG. 23). Next, in a cell at which the created row and the priority field intersect with each other, the communication terminal list update module 42 stores the priority, for example, "4.0", of the relevant communication terminal, calculated in S1114.

Step S1117: The target communication terminal selection module 43 updates the priority stored in the registered waiting-AP information list L5 in FIG. 23.

A case where, in the registered waiting-AP information list L5 in FIG. 23, the identifier of, for example, the communication terminal 2b selected in S1112 is stored is assumed. In this case, in the registered waiting-AP information list L5 in FIG. 23, the target communication terminal selection module 43 stores the priority of the communication terminal 2b calculated in S1114, in a cell at which the row in which the identifier of the communication terminal 2b selected in S1112 is stored and the priority field intersect with each other.

Based on the update of the priority in S1117, it is possible to reflect in real time a change in the priority, in the registered waiting-AP information list L5 in FIG. 23.

If the processing operations in S1116 and S1117 finish, the processing shifts to S1118. In a case of being determined as NO in S1113, the processing shifts to S1119, as described above.

Step S1118: The target communication terminal selection module 43 determines whether all the communication terminals located within the extended region of the wireless communication device selected in S1111 are selected from the communication terminal list L1' in FIG. 22. In a case where all the communication terminals are selected (S1118: YES), the processing shifts to S1121. In a case where all the communication terminals are not selected (S1118: NO), the processing returns to S1112.

Step S1119: The target communication terminal selection module 43 determines whether the communication terminal selected in S1112 previously existed within the wireless communication area of the wireless communication device selected in S1111. The processing operation in S1119 is the same as the processing operation in S1115.

In the case of the above-mentioned example, it is assumed that the identifier, "080-zzzz-aaaa", of the communication terminal 2b selected in S1112 is stored in the communication terminal identifier field in the registered waiting-AP information list L5 in FIG. 23.

In a case where the communication terminal selected in S1112 does not previously exist within the wireless communication area of the wireless communication device selected in S1111 (S1119: NO), the processing returns to S1118. In a case where the communication terminal selected in S1112 previously existed within the wireless communication area of the wireless communication device selected in S1111 (S1119: YES), the processing shifts to S1120.

Based on S1113 and S1119 described above, the communication control device 4 senses a communication terminal that moves out of the wireless communication area of the wireless communication device selected in S1111.

Step S1120: The communication terminal list update module 42 identifies, from within entries (each corresponding to one row) of the registered waiting-AP information list L5 in FIG. 23, a row including the identifier of the communication terminal selected in S1112 and deletes the identified row. After the processing operation in FIG. 25 finishes (S1121: YES), the processing shifts to S12 in FIG. 24.

Based on the processing in FIG. 25, the communication terminal list update module 42 creates the registered waiting-AP information list L5 in FIG. 23.

Instructions for Update of Registered AP Information List and Registration and Deletion of AP Information Based on the location information and the priority of the corresponding communication terminal 2, the communication terminal list update module 42 in the communication control device 4 updates the registered AP information list L2 in FIG. 11 (S12).

Figure 26:
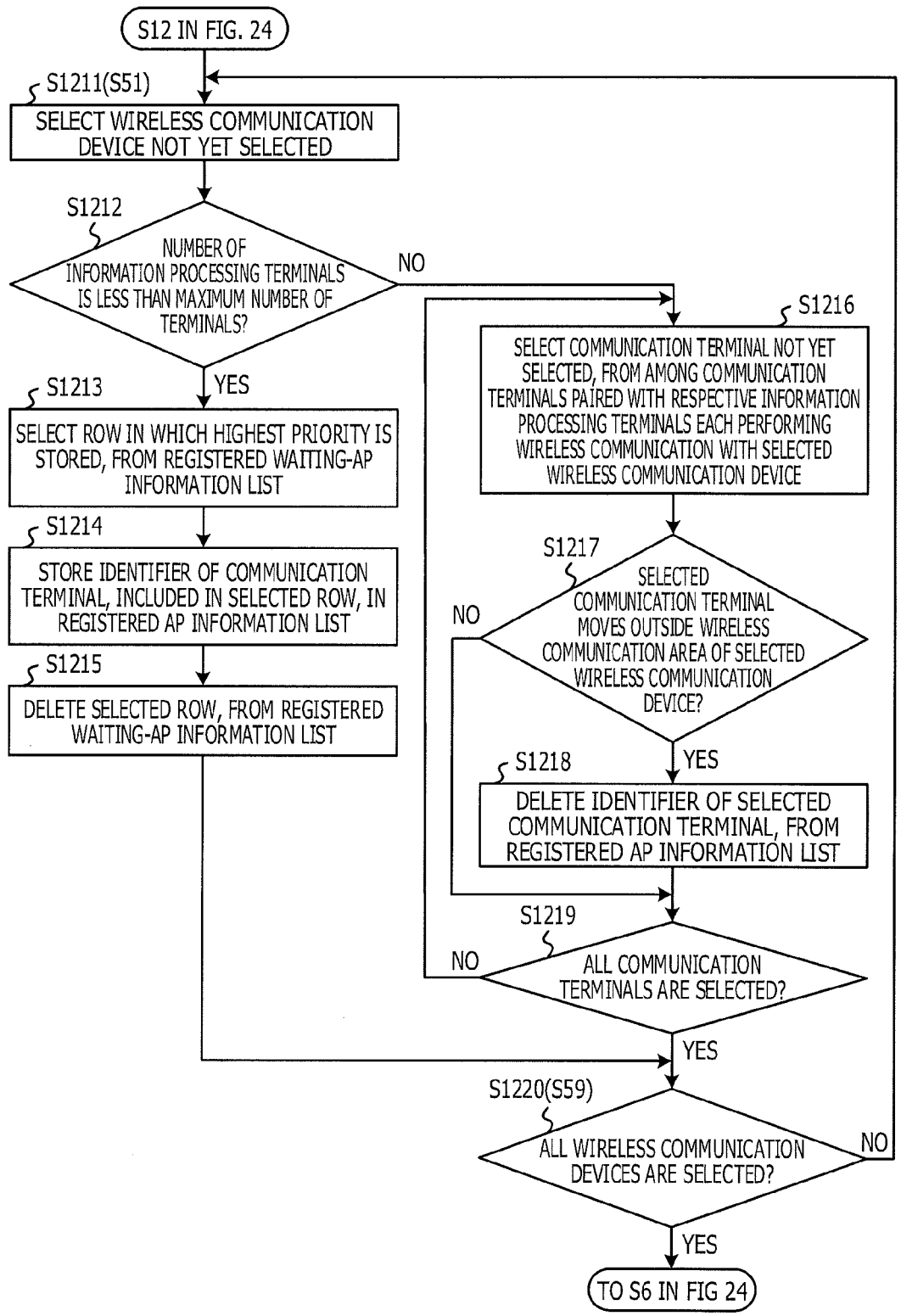
FIG. 26 is a flow diagram for explaining registered AP information list update processing in S12 in FIG. 24.

Based on processing to be described in FIG. 26, the communication control device 4 updates the registered AP information list L2 in FIG. 11. Specifically, based on the processing to be described in FIG. 26, the communication control device 4 causes the tethering communication of the corresponding communication terminal whose priority is high to be stopped and causes the corresponding information processing terminal paired with the relevant communication terminal whose priority is high and the corresponding wireless communication device to perform wireless communication with each other.

FIG. 26 is a flow diagram for explaining the registered AP information list update processing in S12 in FIG. 24. Since S1211 and S1220 in FIG. 26 are the same as S51 in FIG. 18 and S59 in FIG. 18, respectively, the descriptions thereof will be omitted.

Step S1212: The target communication terminal selection module 43 in the communication control device 4 determines whether the number of information processing terminals that each perform communication with the wireless communication device 5 selected in S1211 is less than the maximum number of terminals. In other words, the target communication terminal selection module 43 determines whether there is an empty entry in the registered AP information list stored while being associated with the wireless communication device 5 selected in S1211. The number of entries in this registered AP information list is limited and corresponds to the maximum number of terminals.

The wireless communication device 5 selected in S1211 is, for example, the wireless communication device 5a. The maximum number of terminals is the number of information processing terminals with which the corresponding wireless communication device 5 is able to simultaneously perform wireless communication. The maximum number of terminals is preliminarily stored in the storage 402 in the communication control device 4 while being associated with the identifier of the corresponding wireless communication device 5.

In a case where the number of information processing terminals performing communication with the wireless communication device 5 selected in S1211 is greater than or equal to the maximum number of terminals (S1212: NO), the processing shifts to S1216. In a case where the number of information processing terminals performing communication with the wireless communication device 5 selected in S1211 is less than the maximum number of terminals (S1212: YES), the processing shifts to S1213. Note that the wireless communication device 5 selected in S1211 is, for example, the wireless communication device 5a.

Step S1213: The communication terminal list update module 42 in the communication control device 4 selects an entry (row) in which the highest priority is stored, from the registered waiting-AP information list L5 (see FIG. 23) of the wireless communication device 5 selected in S1211. In the example of the registered waiting-AP information list L5 in FIG. 23, the second row (the row in which the priority, "4.0", is stored) from the top thereof is selected.

Step S1214: The communication terminal list update module 42 newly creates an entry (one row) in the registered AP information list L2 in FIG. 11 and stores the identifier of the corresponding communication terminal, included in the entry (row) selected in S1213, in a cell at which the created row and the communication terminal identifier field intersect with each other.

Next, in the communication terminal list L1' in FIG. 22, the communication terminal list update module 42 stores the identifier of the wireless communication device selected in S1211, in a cell at which a row in which the identifier of the corresponding communication terminal, included in the row selected in S1213, is stored and the registration destination AP field intersect with each other.

In the case of the above-mentioned example, the communication terminal list update module 42 stores the identifier, "080-zzzz-aaaa", of the communication terminal 2b, included in the row selected in S1213, in the communication terminal identifier field in the registered AP information list L2 in FIG. 11 (see the third row from the top of FIG. 11). Next, in the communication terminal list L1' in FIG. 22, the communication terminal list update module 42 stores "AP1" in a cell at which a row in which the identifier, "080-zzzz-aaaa", of the communication terminal 2b is stored and the registration destination AP field intersect with each other (not illustrated). Note that this row is the third row from the top in the communication terminal list L1. In addition, "AP1" is the identifier of the wireless communication device 5a.

Based on the processing operation in S1214, a communication terminal more likely to cause mutual interference of radio waves to occur is selected from among communication terminals existing in the wireless communication device 5a.

Step S1215: The communication terminal list update module 42 deletes the row selected in S1213, from among rows in the registered waiting-AP information list L5 in the corresponding wireless communication device 5. Based on the processing operation in S1215, the identifier of a communication terminal waiting until tethering communication is stopped is deleted. After S1215 finishes, the processing shifts to S1220.

Based on the following S1216 to S1219, in a case where the corresponding information processing terminal 1 that performs wireless communication with the corresponding wireless communication device 5 under the control of the communication control device 4 moves outside the communication area of the corresponding wireless communication device 5, the communication control device 4 senses the corresponding communication terminal 2 paired with the corresponding information processing terminal 1.

Step S1216: The target communication terminal selection module 43 selects a communication terminal not yet selected, from among communication terminals paired with the respective information processing terminals each performing wireless communication with the wireless communication device 5 selected in S1211. Specifically, the target communication terminal selection module 43 selects one identifier not yet selected, from among the identifiers of communication terminals registered in the registered AP information list L2 (see FIG. 11) of the wireless communication device 5a selected in S1211.

Step S1217: The target communication terminal selection module 43 determines whether the communication terminal selected in S1216 moves outside the wireless communication area of the wireless communication device 5a selected in S1211. In the above-mentioned example, the target communication terminal selection module 43 determines whether the communication terminal 2 selected in S1216 exists outside the circle of the radius R51a centered at the location (for example, (the latitude (Y15° Y25', Y35") and the longitude (X15° X25', X35")) of the wireless communication device 5a selected in S1211.

In a case where the communication terminal 2 selected in S1216 exists outside the circle of the radius R51a, it is determined that the communication terminal 2 selected in S1216 moves outside the wireless communication area of the wireless communication device 5a selected in S1211 (S1217: YES), and the processing shifts to S1218. In a case where the communication terminal 2 selected in S1216 exists within the circle of the radius R51a, it is determined that the communication terminal 2 selected in S1216 does not move outside the wireless communication area of the wireless communication device 5a selected in S1211 (S1217: NO), and the processing shifts to S1219.

Step S1218: The communication terminal list update module 42 deletes the identifier of the communication terminal selected in S1216, from the communication terminal identifier field in the registered AP information list L2 in FIG. 11.

Step S1219: The target communication terminal selection module 43 determines whether all the communication terminals are selected from among the communication terminals paired with the respective information processing terminals each performing wireless communication with the wireless communication device 5 selected in S1211. Specifically, the target communication terminal selection module 43 determines whether all the identifiers of the communication terminals registered in the registered AP information list L2 (see FIG. 11) of the wireless communication device 5 selected in S1211 are selected.

In a case where all the communication terminals are selected from among the communication terminals paired with the respective information processing terminals each performing wireless communication with the wireless communication device 5 selected in S1211 (S1219: YES), the processing shifts to S1220. In a case where all the communication terminals are not selected from among the communication terminals paired with the respective information processing terminals each performing wireless communication with the wireless communication device 5 selected in S1211 (S1219: NO), the processing returns to S1216.

In a case where the target communication terminal selection module 43 in the communication control device 4 selects all the wireless communication devices from among one or more wireless communication devices under the control of the device itself (S1220: YES), the processing shifts to S6 in FIG. 24. Note that since S6 is described in detail in the first embodiment, the description thereof will be omitted. In a case where all the wireless communication devices are not selected (S1220: NO), the processing shifts to S1211.

As described above, the communication control device 4 sets priorities for the communication terminals 2 existing in the corresponding wireless communication device 5. Specifically, the communication control device 4 sets a high priority for the corresponding communication terminal where it is possible to further reduce mutual interference of radio waves. In addition, in descending order of the priority, the communication control device 4 causes the tethering communication of each of the communication terminals to be stopped. In addition, the communication control device 4 causes the corresponding wireless communication device to perform wireless communication with the corresponding information processing terminal paired with the corresponding communication terminal whose tethering communication is stopped.

According to the present embodiment, based on this priority setting, it is possible to stop, on a priority basis, the tethering communication of the corresponding communication terminal where it is possible to further reduce mutual interference of radio waves. Therefore, compared with a case where no priority setting is performed, it is possible to further suppress mutual interference of radio waves and it is possible to further suppress the reduction of wireless communication throughput between the communication terminals and the information processing terminals.

In particular, in an environment in which a large number of communication terminals are densely packed (in other words, an environment crowded with users), mutual interference of radio waves easily occurs. In addition, an upper limit is put on the number of information processing terminals with which each of the wireless communication devices is able to perform wireless communication. Therefore, there is a case where it is difficult for the communication control device to cause all the communication terminals to stop tethering communication, all the communication terminals being paired with all the respective information processing terminals existing within the wireless communication area of the corresponding wireless communication device.

In such a case, it is possible to stop, on a priority basis, the tethering communication of the corresponding communication terminal where it is possible to further reduce mutual interference of radio waves. Therefore, it is possible to achieve the reduction of mutual interference of radio waves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control device that controls a communication device configured to be coupled to a network using a first communication, to be coupled to an information processing device using a second wireless communication, and to relay communication between the information processing device and the network using the first communication and the second wireless communication, the communication control device comprising:
   a memory; and
   a processor coupled to the memory and configured to:
   store, into the memory, identification information of the communication device associated with connection information used for setting the second wireless communication between the communication device and the information processing device,
   control the communication device to stop the second wireless communication between the communication device and the information processing device when it is detected that the communication device exists within a wireless communication area of a wireless communication device coupled to the network,
   transmit, to the wireless communication device, the connection information associated with the identification information of the communication device, and
   control the wireless communication device to establish a new wireless connection between the wireless communication device and the information processing device using the connection information.

2. The communication control device according to claim 1, wherein the processor is configured to:
   store, into the memory, range information indicating a range of the wireless communication area of the wireless communication device,
   store, into the memory, location information associated with the identification information and the connection information, the location information indicating a location of the communication device or the information processing device, and
   determine, based on the range information and the location information, whether the communication device identified by the identification information exists within the wireless communication area.

3. The communication control device according to claim 2, wherein the processor is configured to:
   determine that the communication device exists within the wireless communication area when the location is included in the range.

4. The communication control device according to claim 2, wherein the processor is configured to:
   control the wireless communication device to broadcast the connection information associated with the identification information of the communication device existing within the wireless communication area, and
   control the wireless communication device to establish the new wireless connection with the information processing device relating to the connection information.

5. The communication control device according to claim 2, wherein the processor is configured to:
   receive, from each of communication devices including the communication device, the identification information, the location information, a radio wave intensity of the second wireless communication, and the connection information,
   store, with respect to each of the communication devices, the identification information, the location information, the radio wave intensity, and the connection information into the memory,
   calculate, based on the location information and the radio wave intensity, a priority indicating an order of stopping the second wireless communication, for at least one communication device existing within the wireless communication area from among the communication devices, and
   control the at least one communication device to stop the second wireless communication in descending order of the priority.

6. The communication control device according to claim 5, wherein the processor is configured to:
   acquire, in chronological order, a plurality of location information regarding each of the communication devices,
   calculate, based on first location information at a first time and second location information at a second time, a movement velocity of each of the communication devices, and
   calculate the priority, based on the movement velocity and the radio wave intensity of each of the communication devices.

7. The communication control device according to claim 6, wherein the priority increases with an increase in the radio wave intensity and increases with a decrease in the movement velocity.

8. The communication control device according to claim 5, wherein the communication devices perform the second wireless communication with the information processing device respectively using an identical frequency band.

9. The communication control device according to claim 8, wherein
   the communication devices include a first communication device and a second communication device, and
   the second communication device exists within another wireless communication area of the second wireless communication of the first communication device.

10. The communication control device according to claim 1, wherein the processor is configured to:

control the communication device to resume the second wireless communication when it is detected that the communication device that stopped the second wireless communication with the information processing device moves outside the wireless communication area of the wireless communication device.

11. A communication control method of controlling a communication device configured to be coupled to a network using a first communication, to be coupled to an information processing device using a second wireless communication, and to relay communication between the information processing device and the network using the first communication and the second wireless communication, the communication control method comprising:
   storing, into a memory, identification information of the communication device associated with connection information used for setting the second wireless communication between the communication device and the information processing device;
   controlling the communication device to stop the second wireless communication between the communication device and the information processing device when it is detected that the communication device exists within a wireless communication area of a wireless communication device coupled to the network;
   transmitting, to the wireless communication device, the connection information associated with the identification information of the communication device; and
   controlling, by a processor, the wireless communication device to establish a new wireless connection between the wireless communication device and the information processing device using the connection information.

12. The communication control method according to claim 11, further comprising:
   storing, into the memory, range information indicating a range of the wireless communication area of the wireless communication device;
   storing, into the memory, location information associated with the identification information and the connection information, the location information indicating a location of the communication device or the information processing device; and
   determining, based on the range information and the location information, whether the communication device identified by the identification information exists within the wireless communication area.

13. The communication control method according to claim 12, wherein the determining determines that the communication device exists within the wireless communication area when the location is included in the range.

14. The communication control method according to claim 12, wherein the controlling of the wireless communication device controls the wireless communication device to broadcast the connection information associated with the identification information of the communication device existing within the wireless communication area, and controls the wireless communication device to establish the new wireless connection with the information processing device relating to the connection information.

15. The communication control method according to claim 12, further comprising:
   receiving, from each of communication devices including the communication device, the identification information, the location information, a radio wave intensity of the second wireless communication, and the connection information;
   storing, with respect to each of the communication devices, the identification information, the location information, the radio wave intensity, and the connection information into the memory;
   calculating, based on the location information and the radio wave intensity, a priority indicating an order of stopping the second wireless communication, for at least one communication device existing within the wireless communication area from among the communication devices; and
   controlling the at least one communication device to stop the second wireless communication in descending order of the priority.

16. The communication control method according to claim 15, further comprising:
   acquiring, in chronological order, a plurality of location information regarding each of the communication devices; and
   calculating, based on first location information at a first time and second location information at a second time, a movement velocity of each of the communication devices, and
   wherein the priority is calculated based on the movement velocity and the radio wave intensity of each of the communication devices.

17. The communication control method according to claim 16, wherein the priority increases with an increase in the radio wave intensity and increases with a decrease in the movement velocity.

18. The communication control method according to claim 15, wherein the communication devices perform the second wireless communication with the information processing device respectively using an identical frequency band.

19. The communication control method according to claim 18, wherein
   the communication devices include a first communication device and a second communication device, and
   the second communication device exists within another wireless communication area of the second wireless communication of the first communication device.

20. A non-transitory computer-readable storage medium storing a program for controlling a communication device configured to be coupled to a network using a first communication, to be coupled to an information processing device using a second wireless communication, and to relay communication between the information processing device and the network using the first communication and the second wireless communication, and for causing a computer to execute a procedure comprising:
   storing, into a memory, identification information of the communication device associated with connection information used for setting the second wireless communication between the communication device and the information processing device;
   controlling the communication device to stop the second wireless communication between the communication device and the information processing device when it is detected that the communication device exists within a wireless communication area of a wireless communication device coupled to the network;
   transmitting, to the wireless communication device, the connection information associated with the identification information of the communication device; and
   controlling the wireless communication device to establish a new wireless connection between the wireless communication device and the information processing device using the connection information.

* * * * *